(12) United States Patent
Mattson

(10) Patent No.: US 8,332,829 B2
(45) Date of Patent: Dec. 11, 2012

(54) COMMUNICATION SCHEDULING WITHIN A PARALLEL PROCESSING SYSTEM

(75) Inventor: Peter Mattson, Sunnyvale, CA (US)

(73) Assignee: Calos Fund Limited Liability Company, Dover, DE (US)

(*) Notice: Subject to any disclaimer, the term of this patent is extended or adjusted under 35 U.S.C. 154(b) by 1153 days.

(21) Appl. No.: 12/192,862

(22) Filed: Aug. 15, 2008

(65) Prior Publication Data

US 2008/0301694 A1 Dec. 4, 2008

Related U.S. Application Data

(62) Division of application No. 11/973,895, filed on Oct. 9, 2007.

(60) Provisional application No. 60/849,884, filed on Oct. 6, 2006.

(51) Int. Cl.
*G06F 9/45* (2006.01)
(52) U.S. Cl. ........................ 717/140; 712/225
(58) Field of Classification Search .................. 717/140
See application file for complete search history.

(56) References Cited

U.S. PATENT DOCUMENTS

| | | |
|---|---|---|
| 6,202,130 B1 | 3/2001 | Scales et al. |
| 6,513,155 B1 | 1/2003 | Alexander et al. |
| 6,530,076 B1 | 3/2003 | Ryan et al. |
| 6,698,015 B1 | 2/2004 | Moberg |
| 2004/0098554 A1 | 5/2004 | Fougerdux et al. |
| 2005/0132371 A1 | 6/2005 | Lopez-Estrada |
| 2005/0210452 A1 | 9/2005 | Dimpsey et al. |
| 2005/0276388 A1 | 12/2005 | Ethier et al. |
| 2006/0015691 A1 | 1/2006 | Louie et al. |
| 2008/0046666 A1 | 2/2008 | Termaine |
| 2008/0141279 A1 | 6/2008 | Mattson et al. |
| 2008/0301395 A1 | 12/2008 | Mattson et al. |
| 2008/0301418 A1 | 12/2008 | Khailany et al. |
| 2008/0301697 A1 | 12/2008 | Southgate et al. |

OTHER PUBLICATIONS

Ravindran et al.; "Increasing the Number of Effective Registers in a Low-Power Processor Using a Windowed Register File"; ACM; 2003.*
Mattson et al.; "Communication Scheduling"; ACM; 2000.*
Mesman et al.: "Efficient Scheduling of DSP Code on Processors with Distributed Register Files"; IEEE; Nov. 1999.*
Ozer et al.; "Unified Assign and Schedule: A New Approach to Scheduling for Clustered Register File Microarchitectures"; IEEE; 1998.*
Co-pending U.S. Appl. No. 11/973,895, filed Oct. 9, 2007.
Co-pending U.S. Appl. No. 12/192,880, filed Aug. 15, 2008.
Co-pending U.S. Appl. No. 12/192,885, filed Aug. 15, 2008.
Co-pending U.S. Appl. No. 12/192,894, filed Aug. 15, 2008.
Kalev, Danny, "Use Register Variable to Enhance Performance," retrieved from http://www.deux.com/tips/Tip/12477 on Jul. 11, 2011.

* cited by examiner

*Primary Examiner* — Eddie P. Chan
*Assistant Examiner* — Benjamin Geib

(57) ABSTRACT

Within a data processing system, one or more register files are assigned to respective states of a graph for each of a plurality of clock cycles. A plurality of edges are inserted to form connections between the states of the graph, with respective weights being assigned to each of the edges. A best route through the graph is then determined based, at least in part, on the weights assigned to the edges.

28 Claims, 35 Drawing Sheets

FIG. 2A
(Prior Art)

Programmer specifies on-chip address and anchors a variable at that address through pointer-to-type assignment. Thereafter, programmer specifies reference to on-chip address by dereferencing pointer:

define ON_CHIP_ADDR 0x60000 ← 210

**<data type>\* pointer_variable_name = ON_CHIP_ADDR;** ← 212, 214

**\*pointer_variable_name++;** // *access data at in on-chip address*

⤴ 200

⇩

Compiler converts pointer-dereference into machine-level load from (and/or store at) the on-chip address, ultimately part of executable code sequence placed in memory by an operating system or system-level programmer

⤴ 202

⇩

Processor executes on-chip load/store instruction, resulting in direct access to on-chip memory.

Integrated Circuit 240

Processor 250

On-Chip Memory — placement error 255

( x ) ( y ⊘ z )

↔

Off-Chip RAM 159

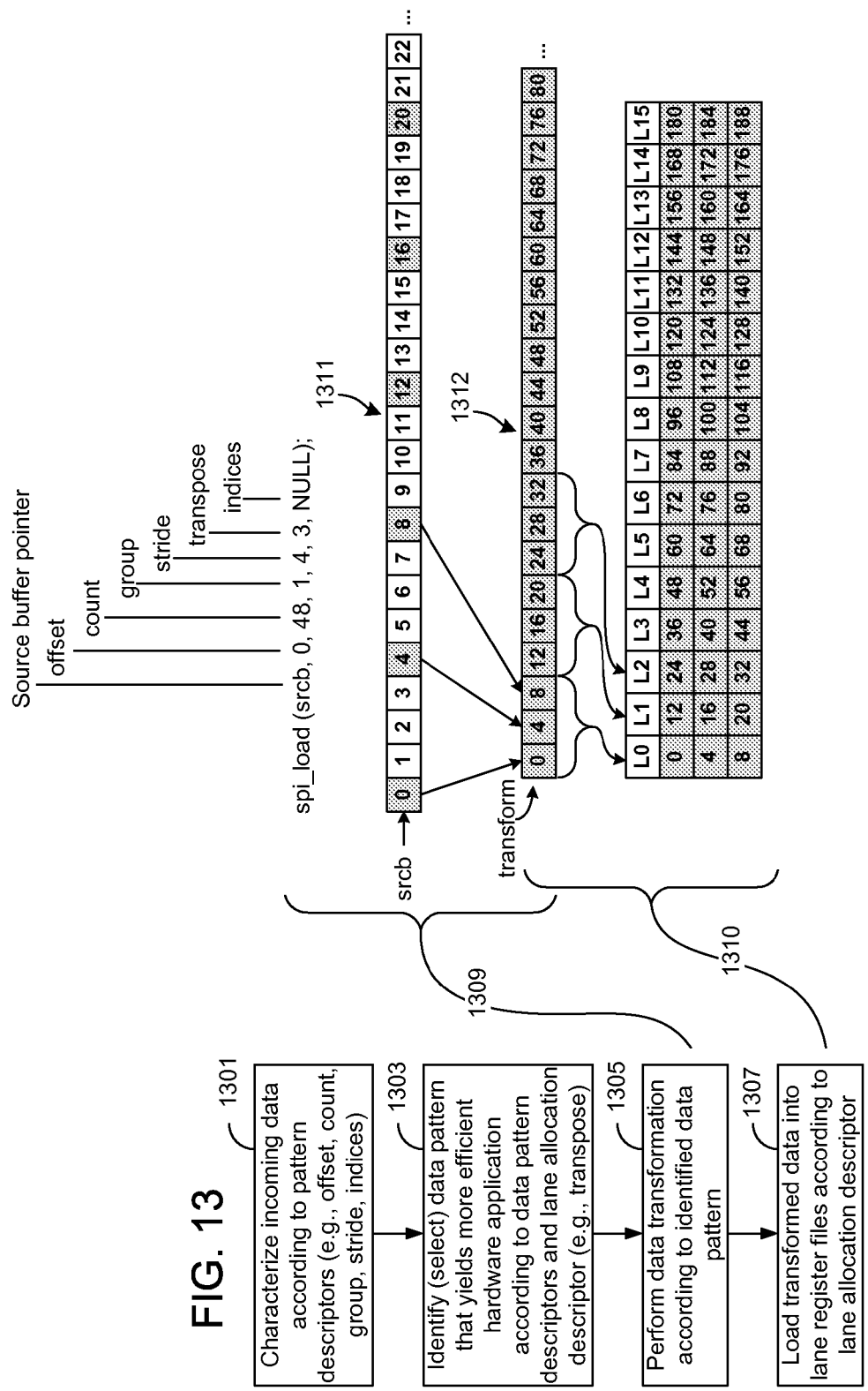

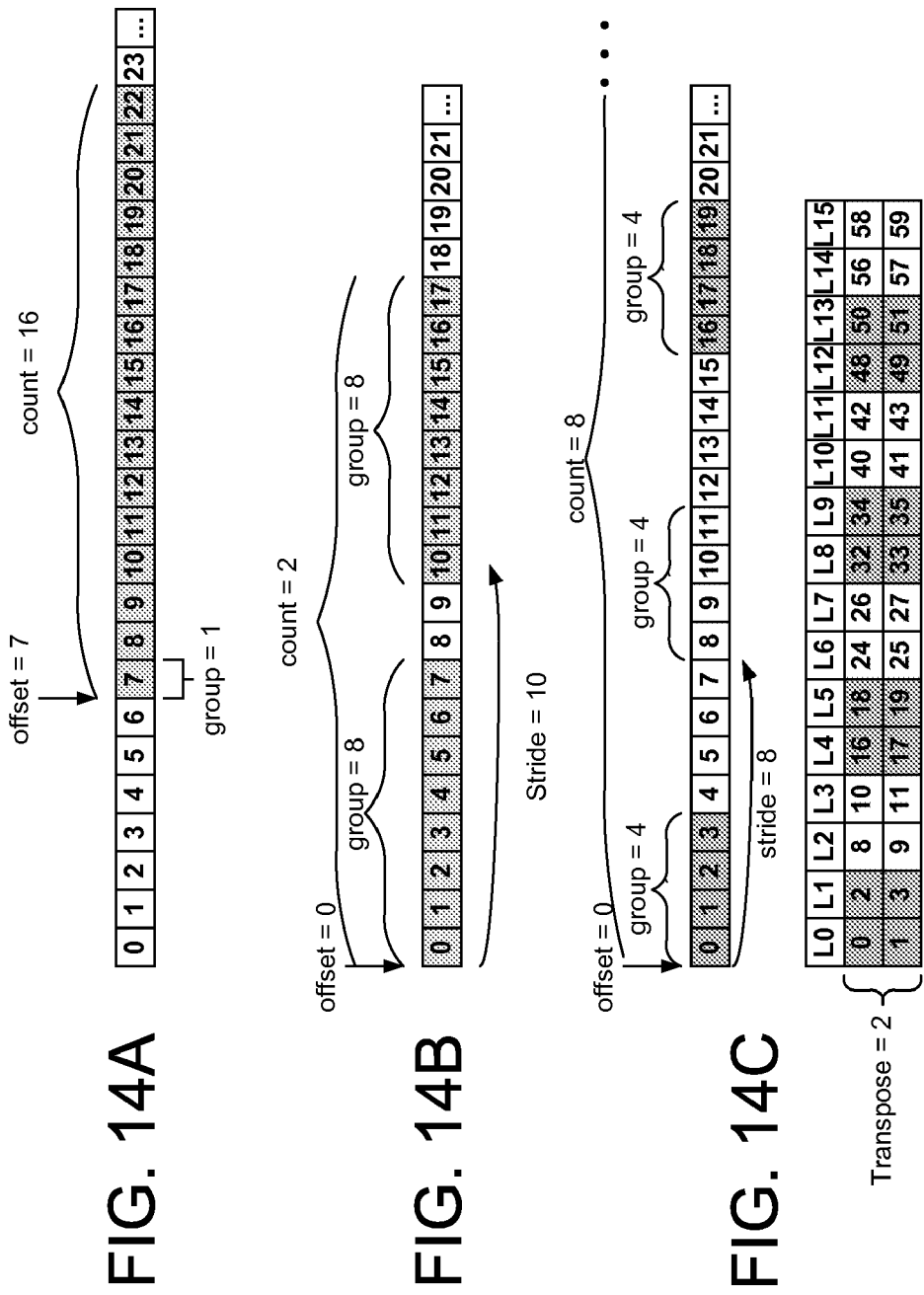

FIG. 15

| Pattern Type | Zero-valued transpose | Indexed data | Integral groups per transpose | Integral transposes per block* | Stride equal group | Transposes per group equals $2^h$ | Transposes per block equals $2^n$ | Index processed | Number of indices |
|---|---|---|---|---|---|---|---|---|---|
| 1 |  |  |  |  | Yes |  |  |  |  |
| 2 |  |  | Yes |  |  | Yes |  |  |  |
| 3 |  | Yes | Yes |  | Yes |  | Yes |  |  |
| 4 |  | Yes |  |  |  | Yes |  | Yes | idxs x count |
| 5 |  |  |  | Yes |  |  |  |  | count |
| 6 |  | Yes |  | Yes |  |  |  | Yes | idxs x count |
| 7 | Yes | Yes |  |  | Yes |  |  |  |  |
| 8 | Yes | Yes |  |  |  |  |  |  |  |
| 9 | Yes | Yes |  |  |  |  |  | Yes | idxs x count |
| 10 | — | — |  |  |  |  |  |  | idxs x block |

*block = count x group

1500

FIG. 16 spi_load (sourcebuf, offset, count, group, stride, transpose, indices)

// select records from input buffer

110   For every index in indices:
120     Start at offset + index
130     Repeat count times:
140       Select group records
150       Advance stride records
160     End Repeat
170   End For // Distribute selected records among lanes 200   While selected records remain:
210     For each lane:
220       Apply transpose selected records to lane
230     End For
240   End While

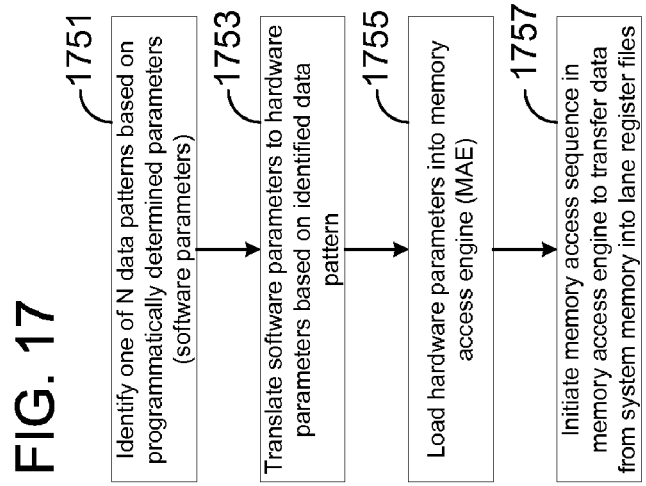

FIG. 17

1751 — Identify one of N data patterns based on programmatically determined parameters (software parameters)

1753 — Translate software parameters to hardware parameters based on identified data pattern 1755 — Load hardware parameters into memory access engine (MAE)

1757 — Initiate memory access sequence in memory access engine to transfer data from system memory into lane register files

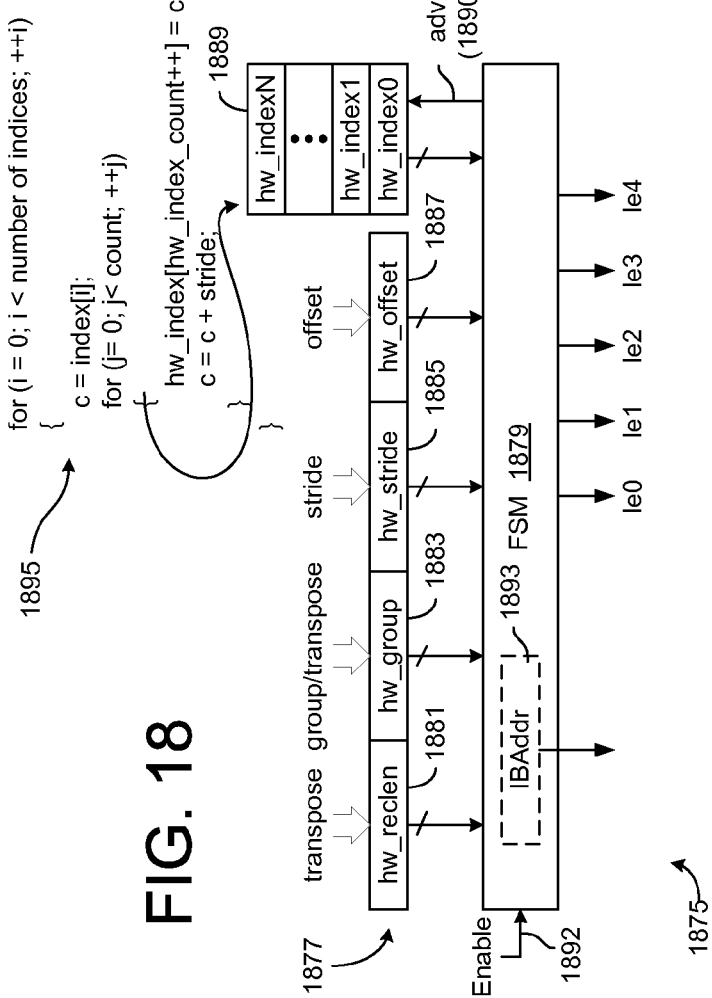

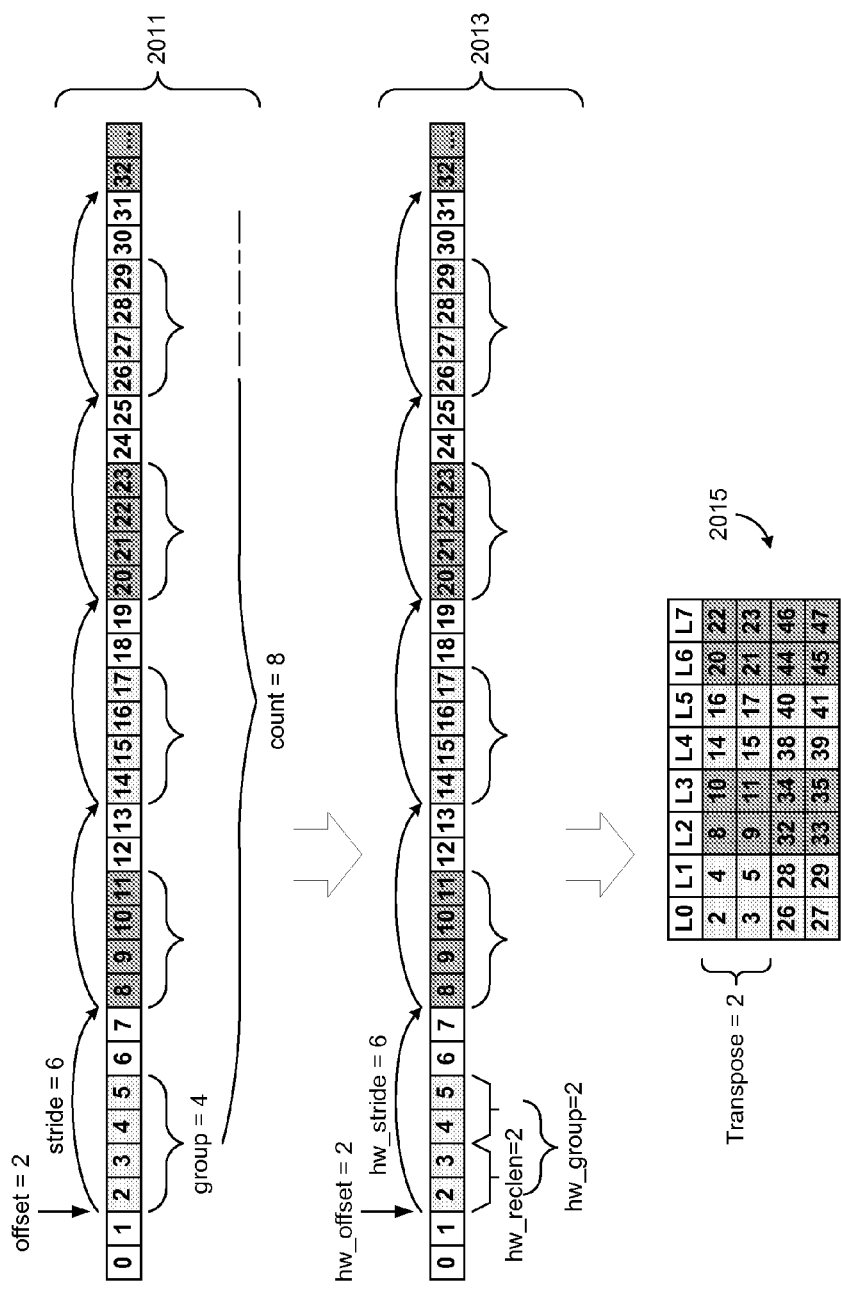

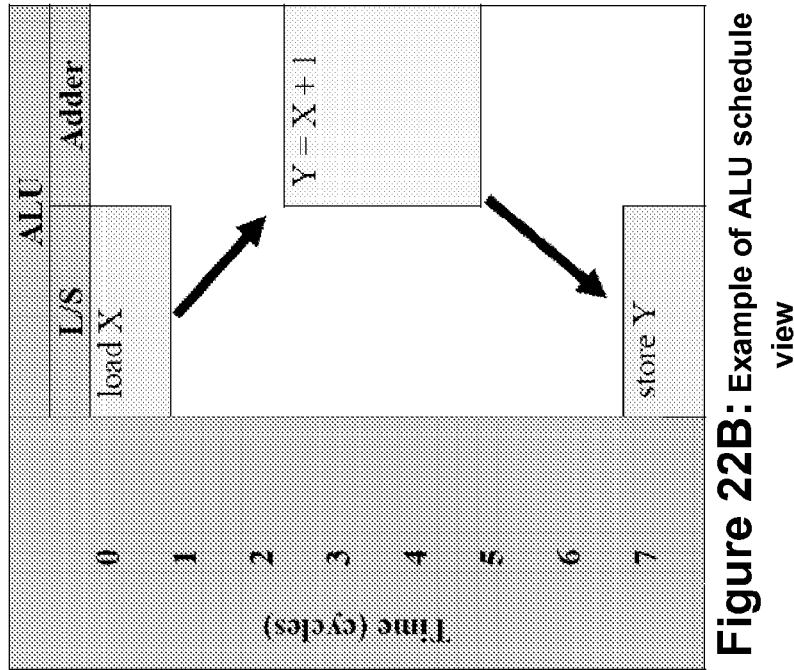
Figure 22B: Example of ALU schedule view
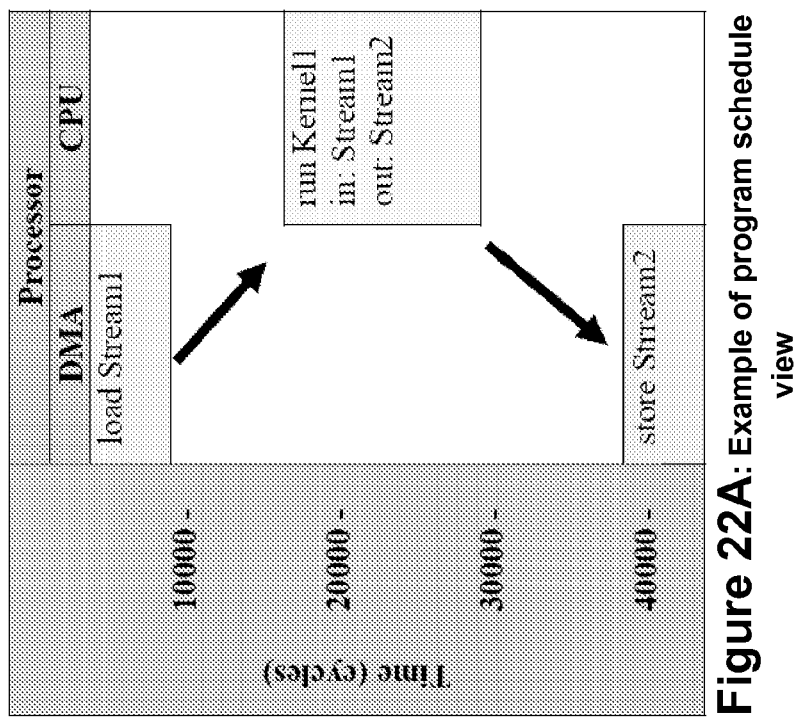
Figure 22A: Example of program schedule view

| Command | Processor | Queued | Executed |
|---|---|---|---|
| Load Stream1 | DMA | 12 | 8592 |
| Run Kernel1 | CPU | 145 | 29653 |
| Store Stream2 | DMA | 381 | pending |
| ... | | | |

Figure 22D: Example of processor operation history/future view

| | Value on specific SIMD processor core | | | |
|---|---|---|---|---|
| Variable | Core 0 | Core 1 | Core 2 | Core 3 |
| X | 512 | 45 | 72 | 193 |
| Y | 513 | 46 | 73 | 194 |
| ... | | | | |

Figure 22E: Example of SIMD debugging view

| | Address, low-bits | | | |
|---|---|---|---|---|
| Address, high-bits | 0x0 | 0x40 | 0x80 | 0xC0 |
| 0x000 | | Stream1 | | |
| 0x100 | | | | |
| 0x200 | | | | |
| 0x300 | | | Stream2 | |
| 0x400 | | | | |
| 0x500 | | | | |
| 0x600 | | | | |
| 0x700 | | | | |

Figure 22C: Example of on-chip memory contents view

COMMUNICATION SCHEDULING WITHIN A PARALLEL PROCESSING SYSTEM

CROSS-REFERENCE TO RELATED APPLICATIONS

This application is a divisional of, and hereby incorporates by reference, U.S. patent application Ser. No. 11/973,895 which was filed Oct. 9, 2007 and claims priority from U.S. Provisional Application No. 60/849,884, filed Oct. 6, 2006.

TECHNICAL FIELD

The disclosure herein relates to data processing systems generally and more specifically to data placement in such systems.

BACKGROUND

In conventional program development systems, a human operator (a programmer) specifies keyword definitions, variable declarations and program functions through syntactical data entry into a text file, commonly referred to as a source file. The source file is compiled into a sequence of machine-executable instructions through execution of a compiler (which is itself a computer program), and stored in an object file. The object file may be linked to one or more other object files through execution of a linking program (e.g., a program which resolves inter-object (as opposed to intra-object) references to functions, variables, definitions and so forth), resulting in creation of an executable code sequence stored as yet another file, called an executable file. In a general purpose data processing system, an operating system (another program execution), responds to a program-execution command by retrieving a specified executable file from a relatively slow, non-volatile storage and placing the machine code from the executable file into a smaller, faster memory commonly referred to as main memory or system memory, and allocating storage for program variables in the main memory. Thereafter, program execution occurs by repeatedly fetching and executing instructions; fetching (retrieving) program instructions from main memory, loading the instructions into an instruction register of a processor, and initiating instruction execution in the processor.

FIG. 1A illustrates the actions of the programmer (100), compiler (102) and then hardware (104) with regard to conventional variable declaration and run-time reference. That is, a programmer initially declares the variable through specification of a data type and a variable name as shown at 112. Thereafter, the programmer may specify an operation to be undertaken with respect to the variable by referencing the variable name in a program statement (e.g., the increment operation shown at 114).

Still referring to FIG. 1A, the compiler responds to the variable declaration by allocating an amount of storage space indicated by the data type specifier, and by correspondingly extending the total data storage space to be allocated to the executable program. The compiler converts the variable reference (e.g., in the increment operation) into a machine level load and/or store instruction that is included within the overall executable code sequence loaded from non-volatile storage into a particular region of operating memory (i.e., placed in the operating memory) by the operating system. In an embedded system or for elemental or kernel programs (e.g., basic input/output services or the like), the executable code may be placed into a particular region of operating memory by a bootstrap loader (primitive program that copies the executable code to a predetermined location in the operating memory) or by more permanent disposition in a non-volatile memory (e.g., a read only memory or any variant thereof).

During program execution, the processor executes the load/store instruction, resulting in issuance of a memory read request to an off-chip memory subsystem. If the system includes an on-chip or off-chip cache, the cache will be queried (e.g., by comparing a portion of the memory address issued in the memory access request with contents of a tag memory) to determine whether the data sought has been cached as part of a preceding memory access. If a cache hit occurs (data is in cache), the data will be retrieved from the cache and the off-chip memory access request canceled. Otherwise, a cache miss occurs, and the off-chip memory access request is completed to fetch the requested data to the processor. FIG. 1B illustrates the transfer of data from off-chip memory 159 (random access memory (RAM) such as dynamic RAM (DRAM) or static RAM (SRAM)) to a processor 150 and cache memory 155 that are disposed on an integrated circuit die 140. After the content of memory region 'x' is recorded in the cache (i.e., as x'), a subsequent memory access directed to memory region 'x' will result in a cache hit, obviating off-chip memory access.

Although the combined actions of the hardware and compiler serve to hide the underlying complexity of memory access from the programmer, enabling the programmer to simply declare variables without concern for their placement in the memory hierarchy represented by the off-chip memory and cache, the on-chip cache tends to be relatively large and slow and thus compromises performance. Worse, in the event of a cache miss, which may occur whenever data has not yet been cached or has been evicted from the cache due to non-access or other reason, a substantial performance penalty occurs in forcing access to off-chip memory.

In high-performance processing systems where the penalties associated with cache operation/cache miss are generally not tolerable, the programmer may specifically place critical data in an on-chip memory that is immediately accessible to the processor. The immediate access to the on-chip memory results in substantially faster access than conventional on-chip cache architectures, and dramatically faster access than in instances of cache miss.

FIG. 2A illustrates the typical operations of a programmer 200, compiler 202 and hardware 204 in a system in which the programmer specifies the on-chip address of critical data. Specifically, the programmer specifies an on-chip address (e.g., as in the definition statement at 210) and anchors a variable at that address through declaration of a pointer to a specified data type, and assignment of the on-chip address to the pointer as shown at 212. Thereafter, the programmer may specify a reference to the on-chip address (i.e., access the content of the variable anchored at the on-chip address) by dereferencing the pointer. This is shown at 214 by an exemplary C programming language statement in which the '*' symbol indicates that the content at the address specified by pointer_variable_name (i.e., 0x60000) is to be incremented.

Still referring to FIG. 2A, a compiler converts the reference to the on-chip address (i.e., the dereferenced pointer) into machine-level instruction to load data from (and potentially to subsequently store incremented at) the on-chip address. As before, the machine level instruction is fetched and executed by a processor, but in this case, due to the specification of on-chip address, execution results in direct access to on-chip memory.

Although substantially higher run-time performance may be achieved through programmer specification of on-chip addresses, program development becomes substantially more complex, particularly where program development is carried out by a team of individuals, as care must be taken to avoid data placement errors (i.e., inadvertent overlap between on-chip storage space allocated to program variables as shown graphically in FIG. 2B by off-chip memory 159 and an integrated circuit 240 that includes a processor 250 and on-chip memory 255). Arranging data in on-chip memory efficiently tends to be time consuming, lengthening the code writing process. Program debugging also tends to become more difficult as data placement errors are often hard to trace. In the worst case, depending on the nature of the data stored and test vectors exercised, the erroneous placement may not be detected at all, leading to release of defective software.

BRIEF DESCRIPTION OF THE DRAWINGS

The disclosure herein is illustrated by way of example, and not by way of limitation, in the figures of the accompanying drawings and in which like reference numerals refer to similar elements and in which:

FIG. 2A illustrates actions of a programmer, compiler and hardware with regard to variable declaration and run-time reference in a high-performance processing environment;

FIG. 2B illustrates a processor, on-chip memory and off-chip memory in which a program developed in accordance with operations shown in FIG. 2A may be executed;

FIG. 13 illustrates a generalized sequence of operations that may be performed to retrieve data stored at arbitrary locations within an input buffer;

FIGS. 14A-14C illustrate data descriptors to characterize data to be retrieved from an input data buffer;

FIG. 15 illustrates a table of example data patterns;

FIG. 16 illustrates a pseudocode description of an example set of data retrieval;

FIG. 17 illustrates a flow diagram for programmatically determining parameters;

FIG. 18 illustrates a memory access engine according to an embodiment;

FIG. 19 illustrates a pseudocode description of an operation of a finite state machine, according to an embodiment;

FIGS. 20A-20B illustrate example register file load operations according to various embodiments;

FIGS. 22A-22E illustrate visualizations for an interactive development environment, according to various embodiments;

DETAILED DESCRIPTION

Figure 1B:
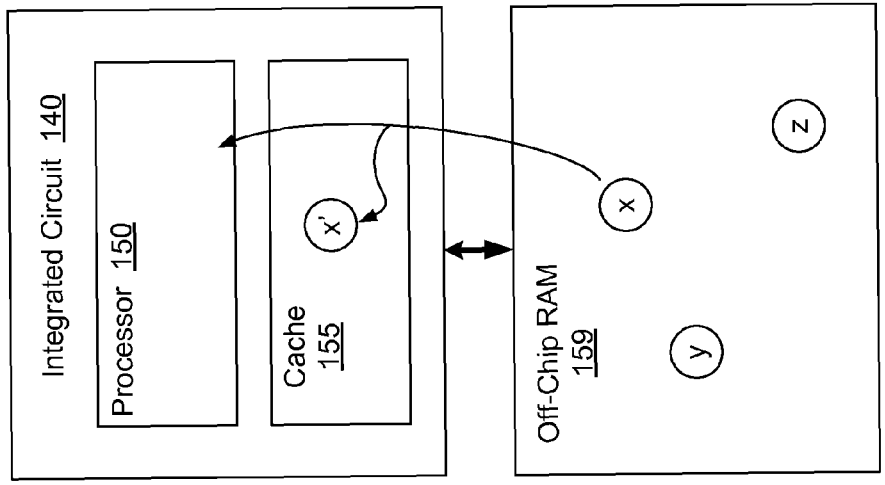
FIG. 1B illustrates a processor, cache and off-chip memory in which a program developed in accordance with operations shown in Figure 1A may be executed.
Figure 1A:
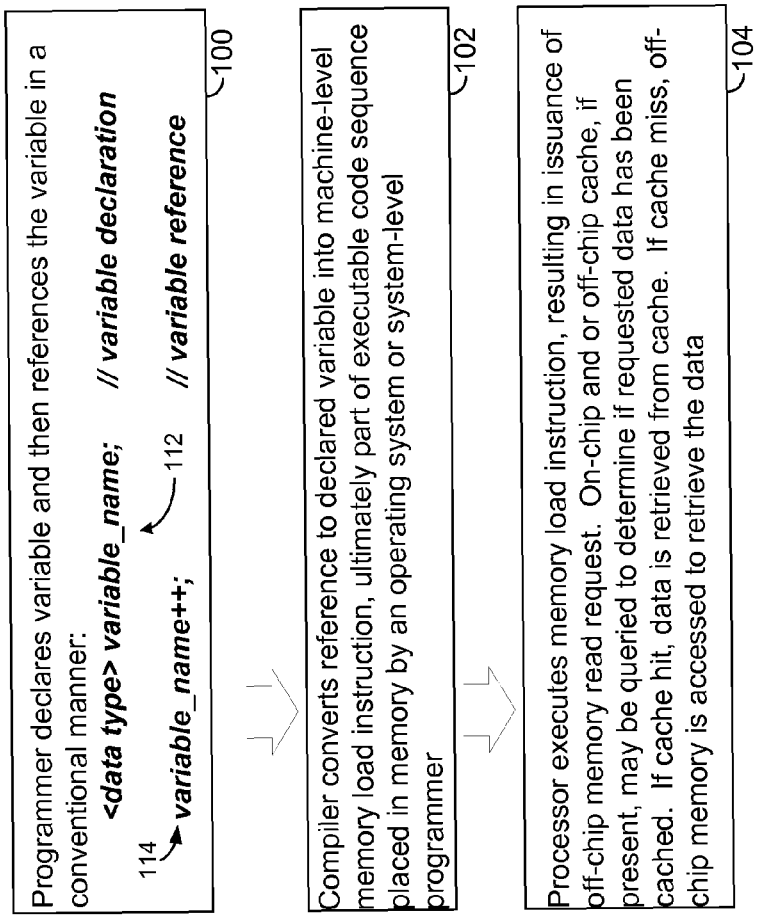
FIG. 1A illustrates actions of a programmer, compiler and hardware with regard to conventional variable declaration and run-time reference.

In embodiments of the invention disclosed herein, a programmer is permitted to categorically control placement of data in either on-chip or off-chip storage by including or omitting an on-chip qualifier or keyword. A compiler, when executed by a data processing system, responds to the on_chip qualifier by determining an available location within on-chip memory in view of previous allocations (resulting from response to prior instances of the on_chip qualifier with respect to other data declarations) and allocating the determined location to the programmer-specified variable. By this arrangement, the programmer may conveniently control whether data is placed on-chip or off-chip and thus avoid the performance penalty associated with the uncontrolled-placement approach described in reference to FIGS. 1A and 1B. At the same time, the programmer need not specify the precise on-chip address of on-chip data, and thus may avoid the inefficiency and susceptibility to placement errors that plagues the precise-placement approach described in reference to FIGS. 2A and 2B. Further, because on-chip data values may be declared by data type and variable name, as opposed to being anchored by a precise pointer assignment, on-chip data variables may be referenced by the programmer by mere reference to the variable name rather than the more confusing pointer dereference described in reference to FIG. 2. From a program execution standpoint, the performance benefits achieved through on-chip data placement are fully realized as the processor will execute the same machine/level load store instruction, but reference a compiler determined address instead of a programmer specified address.

In another embodiment of the invention, the compiler formulates a communication scheduling as an instance of the well known "shortest-path" problem. This formulation incorporates adding pass operations and spill operations to avoid register file overflows and can be solved optimally in sub-quadratic time. In one embodiment, the compiler uses a conservative approximation to track the number of open communications for which routes can eventually be found. Based on the approximation, it does not schedule routes which would make it impossible to find a route for every open communication.

In various other embodiments of the invention disclosed herein, data characteristics are evaluated to generate a set of data descriptors that may be applied, during program compilation or system run-time, to determine an efficient manner of retrieving arbitrarily located data and allocation of the retrieved data to individual execution lanes. The data descriptors may be expressed by programmer-defined constants, runtime variables, or a combination of constants and variables. In one embodiment, program code having constant data descriptors defined therein may be used to identify, at program compilation time and based on the data descriptors, a pattern of data within an expected input data stream. If constant definitions are not sufficient to enable data pattern identification, data patterns may be identified during program execution (i.e., during system run-time) based on variable data descriptors, or a combination of variable and constant data descriptors. In any case, data descriptors may be iteratively evaluated to identify possible data patterns and corresponding data transformations (i.e., data retrieval sequences, also referred to herein as transforms), testing in progression for data patterns that yield more efficient transformations to data patterns that yield less efficient transformations, defaulting to a lowest-efficiency having assured applicability if no higher-efficiency transformations apply.

Compiler-Controlled On-Chip Data Placement

Figure 3B:
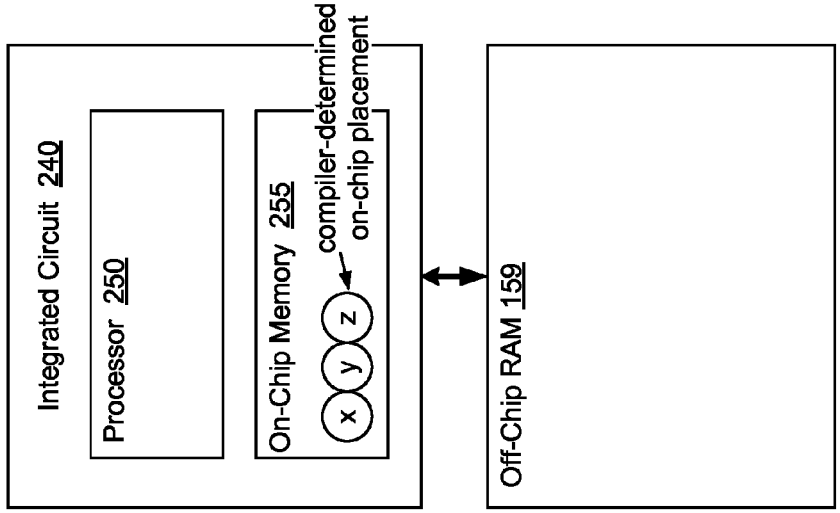
FIG. 3B illustrates a processor, on-chip memory and off-chip memory in which a program developed in accordance with operations shown in FIG. 3A may be executed.
Figure 3A:
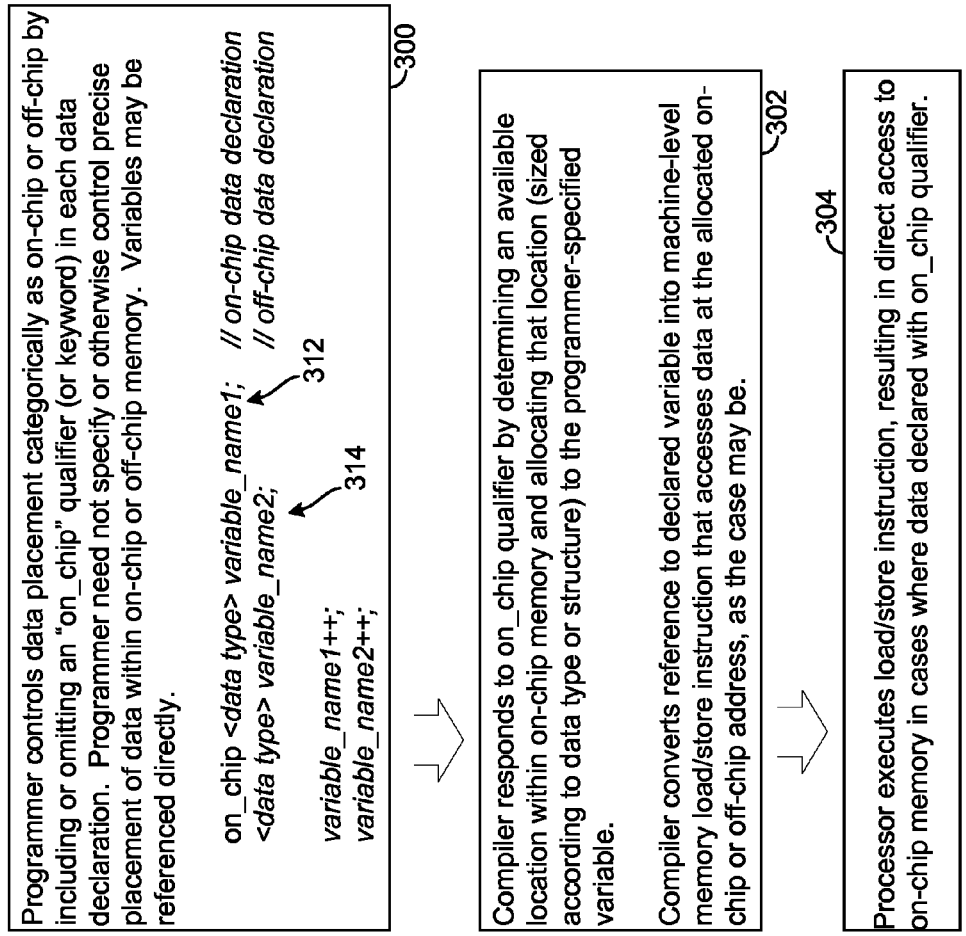
FIG. 3A illustrates actions of a programmer, compiler and hardware with regard to variable declaration and run-time reference in accordance with an embodiment.

FIG. 3A illustrates exemplary operations of a programmer 300, compiler 302 and hardware 304 in a system in which the programmer is enabled to categorically, but non-specifically (i.e., without entering or otherwise expressing a precise on-chip address) specify placement of data as on-chip or off-chip, an approach referred to herein as keyword-controlled data placement. In the embodiment shown, the programmer may specify that a given data value (having a size and structure according to the data type) is to be placed on_chip (i.e., having a region of on-chip memory allocated for storage of the values assigned to the variable) by providing (i.e., typing into a source file) the qualifier or keyword "on_chip" as a prefix to the data type specification, as shown at 312. Off-chip placement may be specified by omitting the on-chip keyword as in the declaration shown at 314.

Referring to FIGS. 3A and 3B, the compiler responds to the on_chip qualifier by determining an available location within on-chip memory 255 (i.e., memory disposed on same integrated circuit die 240 as processor 250) and allocating that location to the programmer-specified variable. Note that the location may encompass a range of memory addresses, as where the data type of the declared variable is an array, data structure, double-word, floating point value or otherwise includes multiple constituent bytes. When the on_chip qualifier is omitted from a variable declaration, the compiler allocates memory in an off-chip storage (e.g., off-chip memory 159 shown in FIG. 3B).

The compiler converts a reference to a declared variable into a machine-level instruction to access (load and/or store) data at the allocated address, thereby accessing on-chip memory directly to load/store data that has been placed on-chip (i.e., variable declared with on_chip keyword), and accessing off-chip memory (or possibly on-chip or off-chip cache) for data placed in off-chip memory (i.e., declared without on_chip keyword and with an off-chip keyword). The processor executes the load/store instruction by directly accessing on-chip memory at the compiler-determined address for variables declared with the on_chip qualifier and issuing request to access off-chip memory (and, if cache present, instruction/signals to query the cache) for variables declared with the off_chip qualifier.

In cases where a loading agent (e.g., an operating system or other executed program) loads program code into system memory and allocates data space for program execution (i.e., as opposed to predetermined code placement and data space allocation that may occur, for example, in an embedded application), the compiler may qualify on-chip address references as being absolute rather than relative to ensure that data is correctly placed within on-chip storage. Other, off-chip locations may be specified by the compiler as being relative to the starting address of the data space for the program, an address that may not be resolved until program run time.

Still referring to FIG. 3, it should be noted that the on-chip qualifier may be expressed by a keyword other than on_chip. Also, instead of defaulting to off-chip allocation in the absence of the on-chip qualifier, an explicit off-chip keyword (e.g., "off_chip") may be used to express off-chip allocation, and the compiler itself then may automatically determine placement of a variable declared without an on-chip or off-chip qualifier (referred to herein as an non-categorized or unanchored variable). For example, in one embodiment, the compiler may determine the available on-chip memory based on explicit allocations, and then choose to locate frequently accessed or otherwise critical data (as determined by the number of variable references that appear in the compiled program code and/or source file or by a qualifier that hints at data criticality) on-chip if sufficient on-chip storage is present. In another embodiment, a hierarchy of data placement qualifiers may be provided to enable the programmer to specify, by providing a first qualifier, that data is to be placed certainly on-chip, and then, by a second, different qualifier, that data is optionally to be placed on-chip at the compiler's option and based on various factors (e.g., whether sufficient on-chip space exists and/or whether a threshold number of references or frequency of references in proportion to total number of variable references, etc. appears in compiled code or source code). Also, where the target hardware platform includes multiple different classes of on-chip storage, multiple on-chip qualifiers, each corresponding to the different storage class may be available to the programmer to allow categorical control over data placement within the different classes of on-chip storage without requiring specification of particular storage addresses. In such an embodiment, the compiler may respond to each different on-chip qualifier by determining a specific storage location within the specified on-chip storage and allocating same to the declared variable.

Associating Buffers with an Access Pattern so that the Compiler can Insert Loads and Stores as Needed The contents of the buffers can be managed using one of any number of methods.

Three examples are:

1. Data can be loaded to or stored from each buffer explicitly by the programmer.
2. A specific data access pattern, as described below under the heading Efficient Data Loading In a Data-Parallel Processor, can be bound to each buffer, and the compiler can load and store the contents as needed.
3. A hybrid approach in which the programmer explicitly specifies loads and stores but the compiler may add, remove, or alter load and stores for optimization purposes or to enable more buffers to fit in the on-chip memory.

The code from the example may be expressed using method one as follows:

```
// declare on-chip memory buffers, placed by compiler
stream int in_even_rows(SIZE / 2);
stream int in_odd_rows(SIZE / 2);
stream int out(SIZE / 4);
// load input data
spi_load(in_even_rows, &in_image[0][0], 0, image_height / 2,
```

```
        image_width, image_width * 2, 2, 0);
    spi_load(in_odd_rows, &in_image[0][1], 0, image_height / 2,
        image_width, image_width * 2, 2, 0);
    // compute results
    for (int i = 0; i < size; i += 2) {
        out[i / 2] = (in_even_rows[i] + in_even_rows[i + 1] +
            in_odd_rows[i] + in_odd_rows[i + 1]) / 4;
    )
    // store output data
    spi_store(out, &out_image[0][0], size / 4, 1, 1, 1, 0);
```

Using method two, the example may be expressed as:

```
// declare on-chip memory buffers, placed by compiler
stream int in_even_rows(SIZE / 2, &in_image[0][0], 0, image_height / 2,
    image_width, image_width * 2, 2, 0);
stream int in_odd_rows(SIZE / 2, &in_image[0][1], 0, image_height / 2,
    image_width, image_width * 2, 2, 0);
stream int out(SIZE / 4, &out_image[0][0], size / 4, 1, 1, 1, 0);
// compute results, compiler inserts loads to fill and drain buffers as needed
for (int i = 0; i < size; i += 2) {
    out[i / 2] = (in_even_rows[i] + in_even_rows[i + 1] +
        in_odd_rows[i] + in_odd_rows[i + 1]) / 4;
)
```

Using hybrid method three, the compiler would optimize the method one code. For example, it might remove the store and a later re-load (not shown) if it was able to persist the out data in the on-chip memory until it is used.

Data Transfer Scheduling for Multiple Register Files

Figure 4:
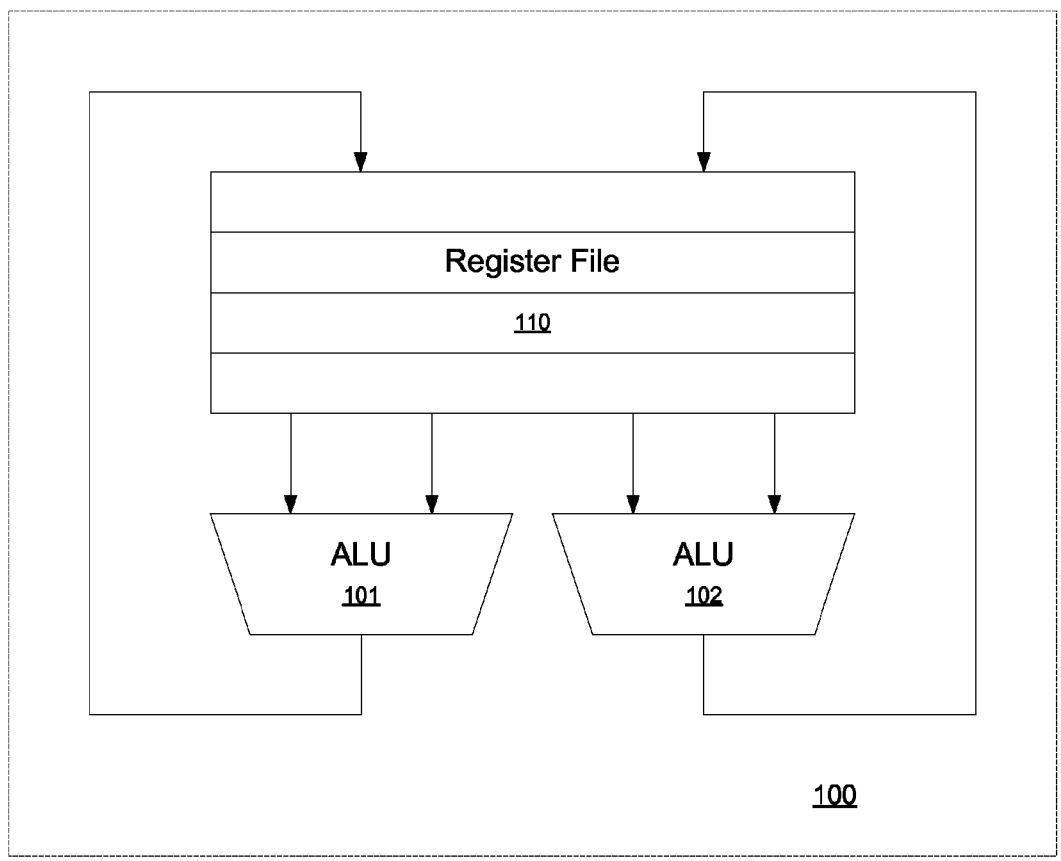
FIG. 4 illustrates an embodiment of a simple processor.

A processor typically comprises a register file, which stores data values, and one or more arithmetic logic units (ALUs), which perform operations on selected data values. A compiler is a program executed by the processor, which contains specific processes for routing data values between the register file and the ALUs. FIG. 4 illustrates an embodiment of a simple processor 100, comprising a register file 110 and ALUs 101 and 102. On every clock cycle, each of the ALUs 101 and 102 reads input data values from the register file, performs a given operation on the data values, then writes an output back to the register file 110. Since there is only a single register file 110, the compiler does not need to determine where output data values are to be stored. In other words, any data value output from either ALU 101 or 102 is simply re-inserted back into the register file 110. However, the size of a register file grows exponentially in proportion to the number of values that can be read from or written to it each clock cycle. Thus, it may be desirable to reduce the number of values that can be read from or written to a register file in a given clock cycle.

Figure 5:
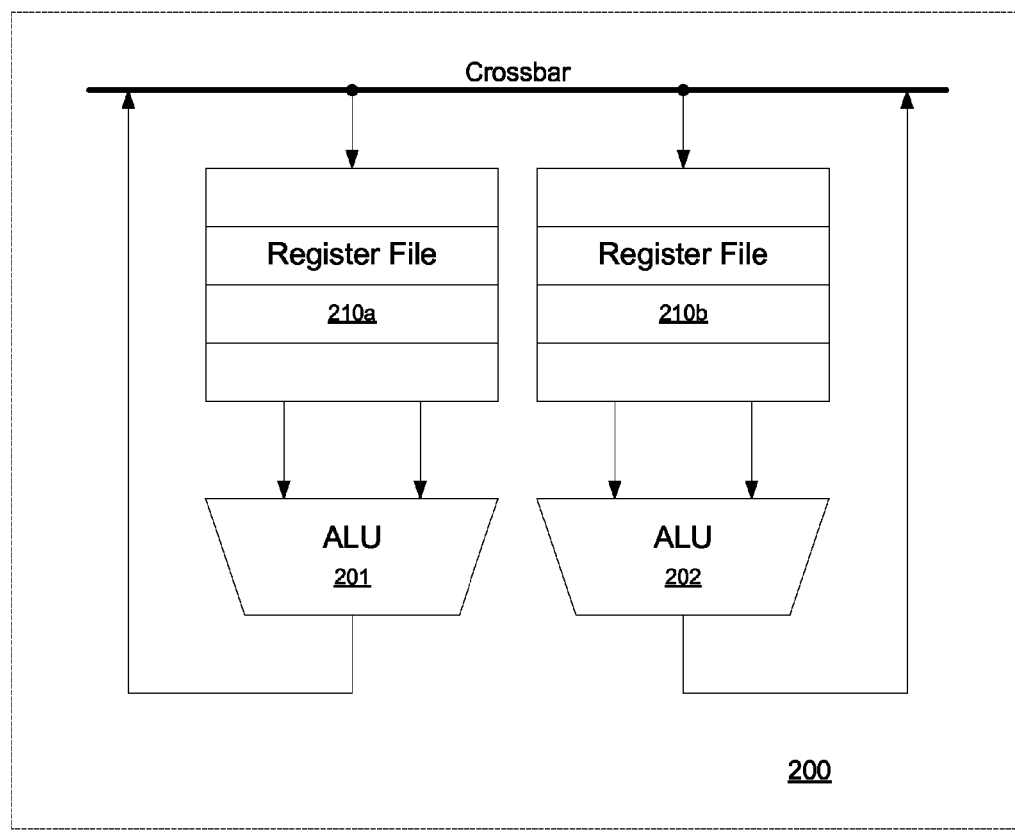
FIG. 5 illustrates an embodiment of a processor with multiple register files.

FIG. 5 illustrates an embodiment of a simple processor 200 with multiple register files. The processor 200 comprises register files 210a and 210b coupled to respective ALUs 201 and 202. In the embodiment of FIG. 5, each ALU 201 and 202 reads inputs from a respective register file 210a and 210b, and performs an operation on them. However, the processor 200 is much more efficient than the processor 100, of FIG. 4, because a single ALU may be allowed to write a value to a given register file (210a or 210b) each clock cycle. Therefore, the register files 210a and 210b may be much smaller than the register file 110, of FIG. 4.

When scheduling operations for a processor with multiple register files, the compiler generally needs to schedule hardware resources to transfer the outputs of each ALU to specific register files and, eventually, to the inputs of other ALUs. The transfer of an output to an input is known as a "communication" and the set of resources used to perform the communication is known as a "route." Communication scheduling addresses the problem of assigning each communication to a route. There are many factors which complicate communication scheduling.

As part of selecting a route, the compiler may need to insert "pass" operations to copy values between register files due to connectivity limits, resource conflicts with other transfers, or to avoid overflowing register files. Referring back to the example of FIG. 5, suppose an output of ALU 202 needs to be communicated to an input of ALU 201, but the register file 210a is completely full during the clock cycle in which ALU 202 needs to write its output. In order to avoid overflowing register file 210a, the data value output from ALU 202 may be temporarily stored back into register file 210b. The compiler must later insert a pass operation to transfer the data from ALU 202 to the register file 210a. In the event that both register files are full, the compiler may need to insert a "spill" operation to store the data to on-chip memory and reload it at a later time. However, spill operations are very costly and inefficient, and should thus be used only in situations where no alternative is available. The issue of communication scheduling may seem rather trivial, in the embodiment of FIG. 5, since there are only two register files (210a and 210b). However, the more register files (and ALUs) there are within a processor, the more complex communication scheduling becomes.

Figure 6:
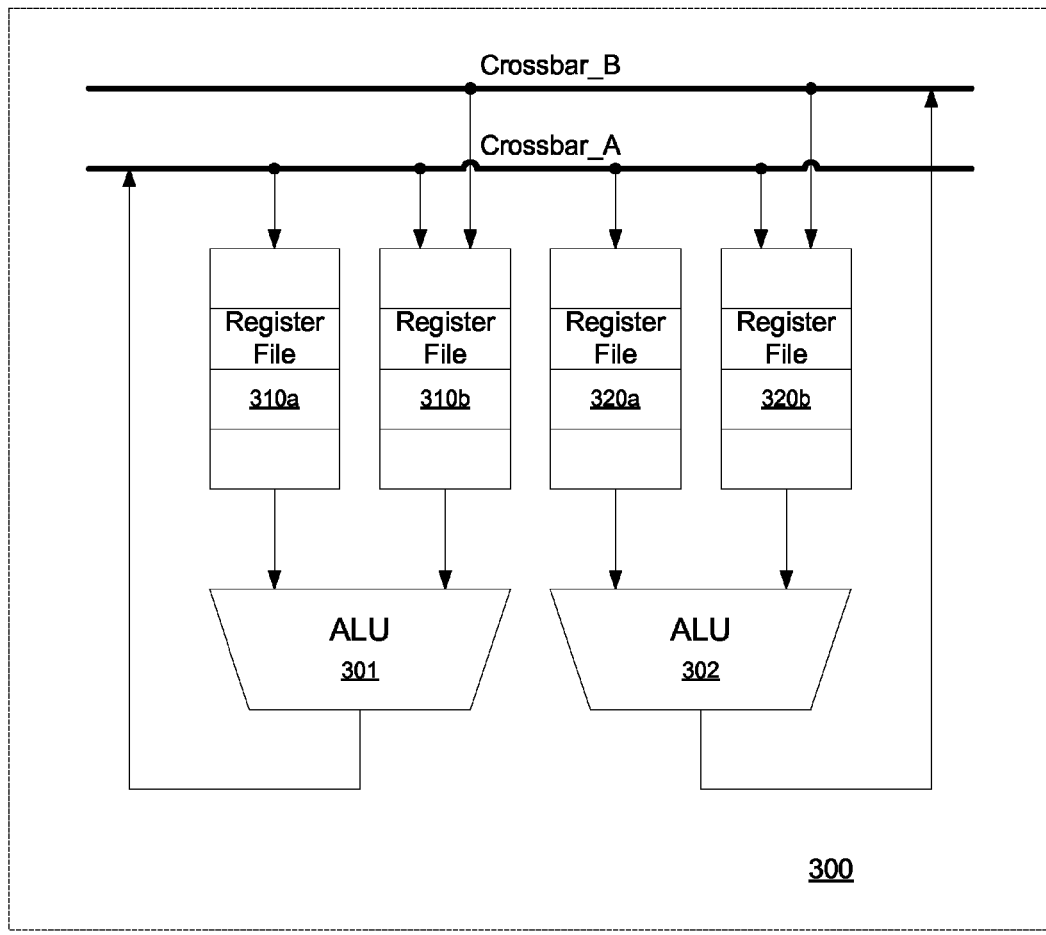
FIG. 6 illustrates another embodiment of a processor with multiple register files.

FIG. 6 illustrates another embodiment of a processor 300 with multiple register files. The processor 300 comprises four register files 310a, 310b, 320a, and 320b, coupled to two ALUs 301 and 302. In the embodiment of FIG. 6, ALU 301 is coupled to receive data values from register files 310a and 310b, and can write output data to any of the register files 310a, 310b, 320a, and 320b, via Crossbar_A. On the other hand, ALU 302 is coupled to receive data values from register files 320a and 320b, but can write output data only to register files 310b and 320b, via Crossbar_B. Thus, in order to route an output from ALU 302 to register files 310a or 320a, one or more intermediate steps must always be scheduled. In other words, an output data value from ALU 302 must first be routed through register file 310b, and ALU 301, in order to be written to register files 310a or 320a. Communication scheduling for processor 300 is thus further compounded by taking into account this necessary intermediate step.

A route can only be found for a communication once both the source and destination operations have been scheduled, but the ability to find a route must be preserved from the time the first operation is scheduled to the time the second operation is scheduled. Thus, suppose the source operation is scheduled first. Until the destination operation is scheduled, the compiler must ensure that routes it chooses for other communications do not make it impossible to find a route due to resource conflicts. A communication between a scheduled operation and an unscheduled operation is called an "open" communication. Referring back to the example of FIG. 6, suppose a first operation scheduled in ALU 302 produces an output consumed by a second, as-yet-unscheduled, operation. Unless the compiler enforces the ability to schedule the communication from ALU 302 to ALU 301, other pairs of communicating operations might be scheduled with communications that write to register files 310b and 320b on the same clock cycle that ALU 302 needs to write its output. However, ALU 302 can only write to register files 310b and 320b, thus rendering the foregoing open communication impossible.

There are several alternative methods for performing communication scheduling. The simplest is to assign all operations to specific ALUs and all inputs and outputs to specific register files before scheduling. Then, insert pass operations that move values between register files as needed. Lastly, schedule all of the operations in time. Though simple, this method substantially restricts scheduling flexibility. For example, in reference to FIG. 6, if an operation is assigned to ALU 301 before scheduling, it might be possible to schedule it on ALU 302 on an earlier cycle during scheduling, but that option would be ignored by the compiler. It is also possible to simply select a source or destination register file for an operation at random when it is scheduled, but this leads to either restricted scheduling flexibility in scheduling the operation(s) which with it communicates, or requires unnecessary passes to move values from arbitrary chosen register files to correct register files.

More complex approaches run the risk of drastically increasing compile time. For example, given multiple operations all trying to write outputs on the same cycle, the compiler might enumerate the possible ways each output can be written, then consider each possible permutation until one is found in which all outputs can be written without resource conflicts. Unfortunately, the time required for the permutation search varies exponentially with the number of ALUs. Further, when trying to connect an output to an input using pass operations, the compiler might consider all possible placements of several pass operations between the two communicating operations. It would need to execute the exponential-cost permutation search for each pass operation placement (which is in turn exponential in the number of pass operations considered). In combination, such challenges can result in compile times ranging from minutes to days.

Figure 7:
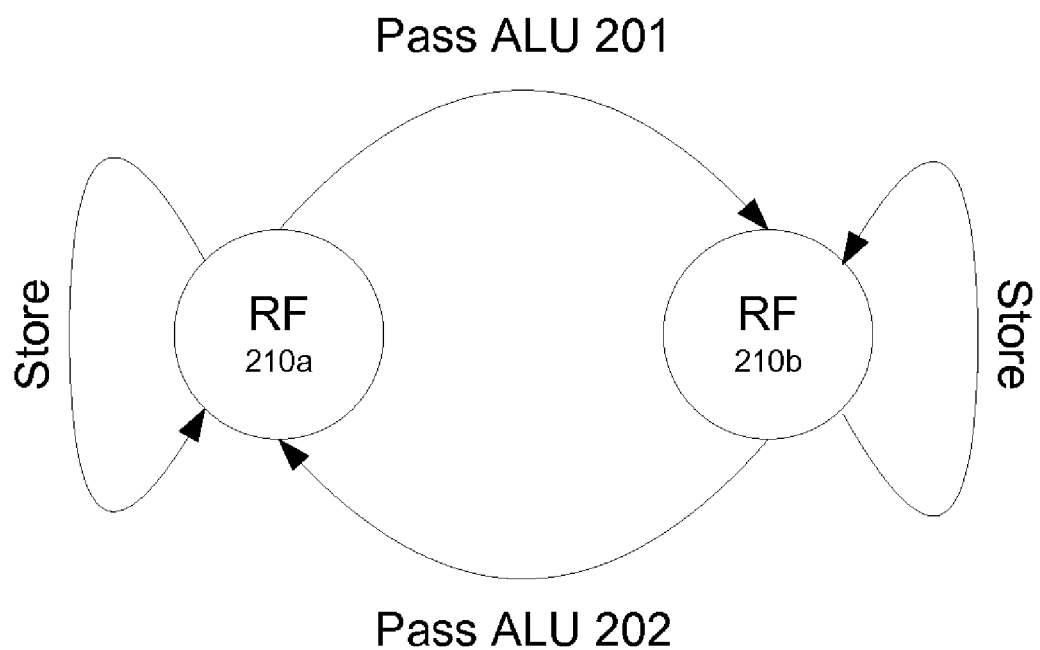
FIG. 7 illustrates a state diagram for communication scheduling according to an embodiment.

FIG. 7 illustrates a state diagram for communication scheduling according to an embodiment of the invention. The state diagram of FIG. 7 is herein discussed in reference to the processor embodiment of FIG. 5. At the start and end of every clock cycle, a data value is in a state corresponding to a particular register file (RF). During each clock cycle, a data value transitions between states along one of two types of edges: "store" edges, wherein the data value is simply kept within the current RF, and "pass" edges, wherein the data value is routed to a different RF. For example, a data value currently stored within RF 210a may, over the next clock cycle, remain in RF 210a (e.g. tracing the store edge) or be routed, via ALU 201, to RF 210b (e.g. tracing the pass edge). On the other hand, a data value currently stored within RF 210b may, over the next clock cycle, remain in RF 210b or be routed, via ALU 202, to RF 210a. In alternative embodiments, "spill" edges may be included to indicate extreme circumstances where it may be necessary to transfer a data value to on-chip memory, to be reloaded at a later time. While state diagram of FIG. 7 is useful for locating a data value within any given clock cycle, in reality, the compiler must trace the complete path of a communication over multiple clock cycles.

Figure 8:
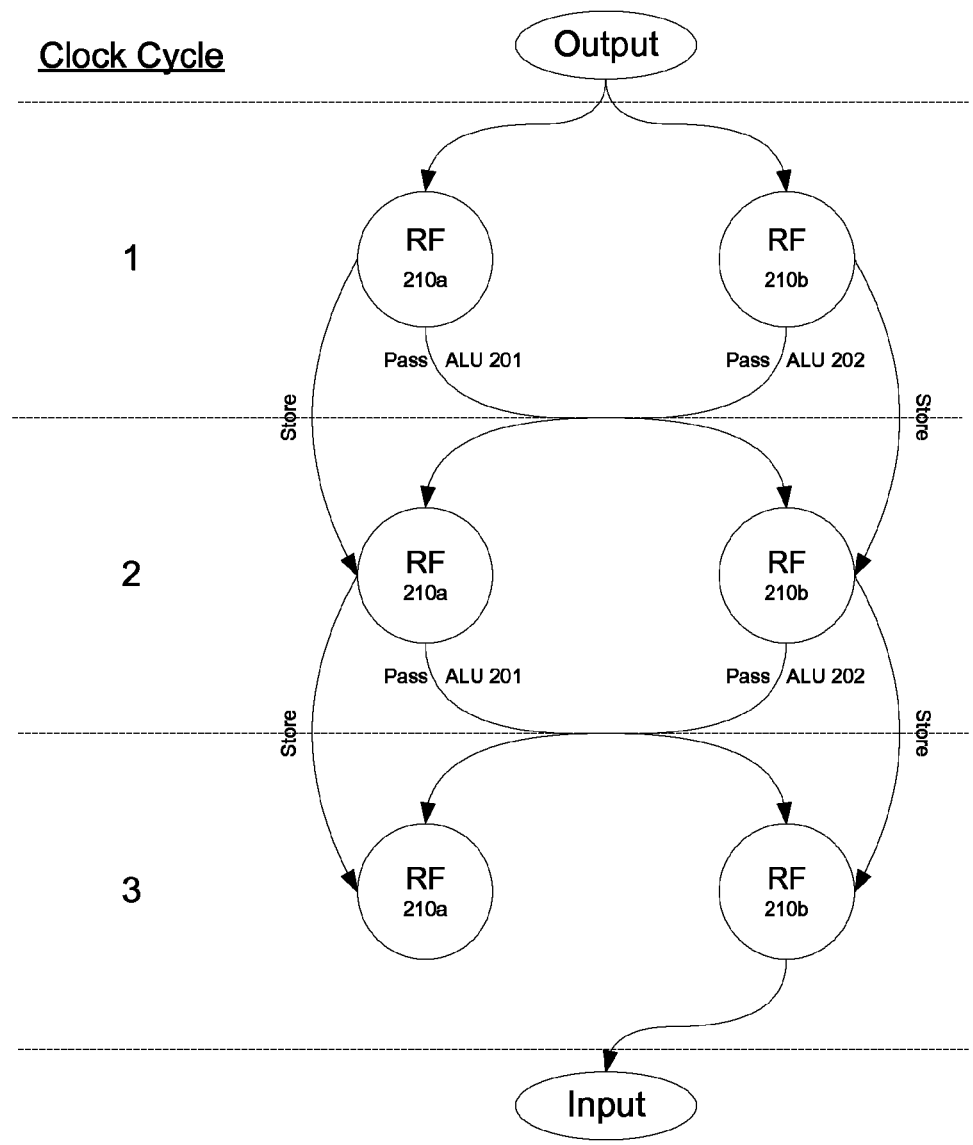
FIG. 8 illustrates a graph for communication scheduling according to an embodiment.
Figure 11A:
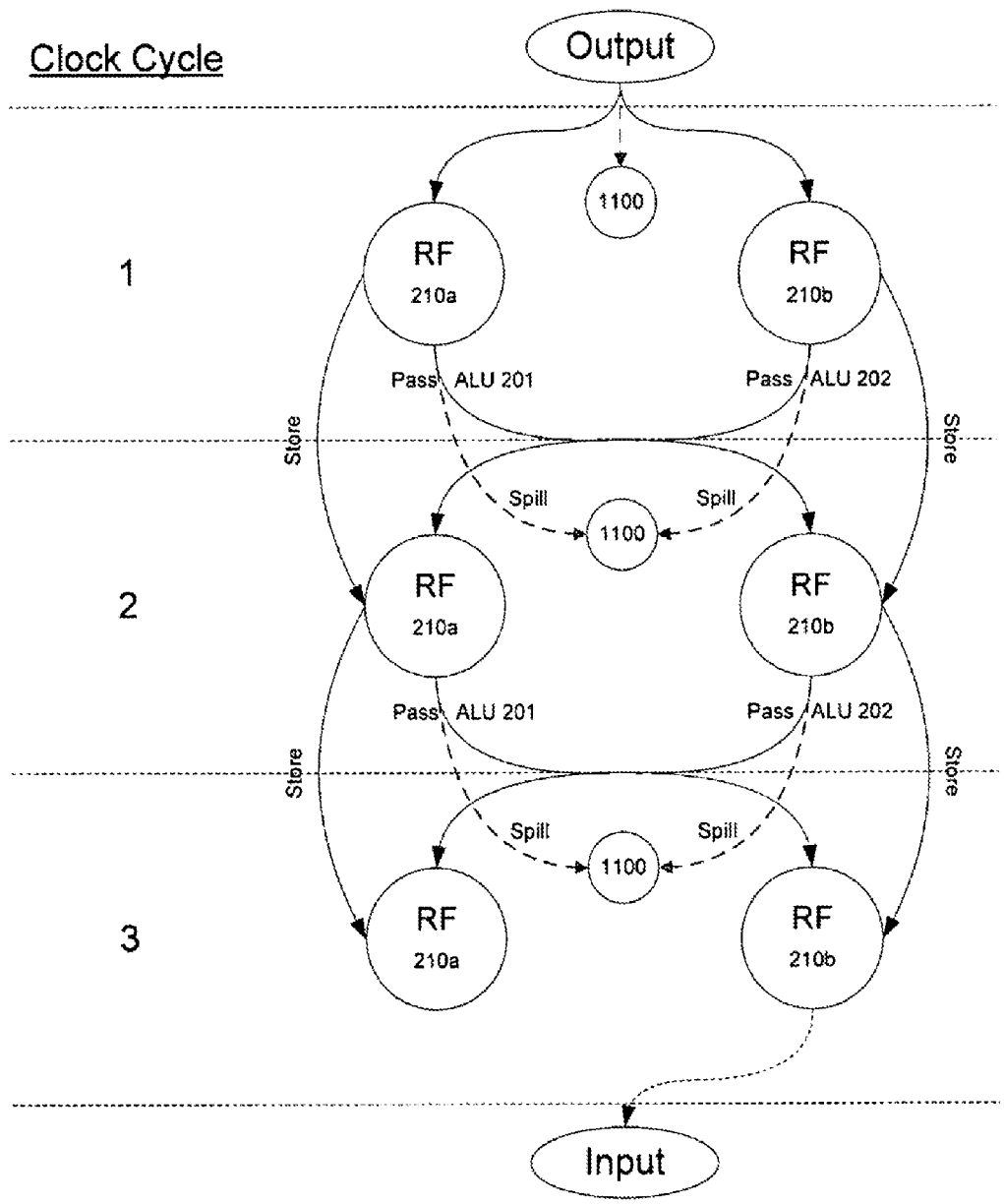
FIG. 11A illustrates a graph for communication scheduling according to an alternative embodiment.

FIG. 8 illustrates a graph for communication scheduling according to an embodiment. The graph of FIG. 8 illustrates the states for each clock cycle in a given communication, wherein the path of a data value can be traced across the span of the entire communication. Pass and store edges connect the states in one clock cycle to the states in the next clock cycle. The "output" state corresponds to the start of the communication, or when a designated ALU outputs the data value. The "input" state corresponds to the end of the communication, or when a designated ALU inputs the data value. In alternative embodiments, "spill" edges may be included to indicate extreme circumstances where it may be necessary to transfer a data value to on-chip memory, to be reloaded at a later time. For example, FIG. 11A illustrates a graph for communication scheduling according to an alternative embodiment, wherein spill edges (represented by dotted lines) connect the states in one clock cycle to on-chip memory 1100 in the next clock cycle.

Any path along the graph of FIG. 8, from the output state to the input state, is a valid plan for when to store and when to pass the data value. For example, in reference to the processor embodiment of FIG. 8, suppose an output of ALU 201 needs to be communicated to an input of ALU 202 after three clock cycles. According to the graph of FIG. 8, there are four valid routes which address this communication scheduling.

In a first route, the data value is output by ALU 201 and stored in RF 210b during the first clock cycle. The data value remains stored in RF 210b during the subsequent second and third clock cycles, and is then input to ALU 202.

In a second route, the data value is output by ALU 201 and stored in RF 210a during of the first clock cycle. The data value remains stored in RF 210a for the duration of the second clock cycle. The data value is then passed, via ALU 201, and stored in RF 210b for the duration of the third clock cycle, and is then input to ALU 202.

In a third route, the data value is output by ALU 201 and stored in RF 210a during the first clock cycle. The data value is then passed, via ALU 201, to be stored in RF 210b for the duration of the second clock cycle. The data value remains in RF 210b for the duration of the third clock cycle, and is then input to ALU 202.

In a fourth route, the data value is output by ALU 201 and stored in RF 210b during the first clock cycle. The data value is then passed, via ALU 202, to be stored in RF 210a for the duration of the second clock cycle. The data value is then passed again, via ALU 201, to be stored in RF 210b for the duration of the third clock cycle, and is then input to ALU 202.

Given the above example, it is clear that the compiler must ultimately choose one "best" route for communication scheduling. And as more register files (RFs) are introduced, more possible permutations of routes arise, thus further complicating the task of choosing a best route. However, selecting a best route may vary each time, depending on the given circumstances. In an embodiment, the compiler may consider all possible permutations of routes for open communications. In alternative embodiment, the compiler may choose a specific route for each open communication arbitrarily.

Figure 9:
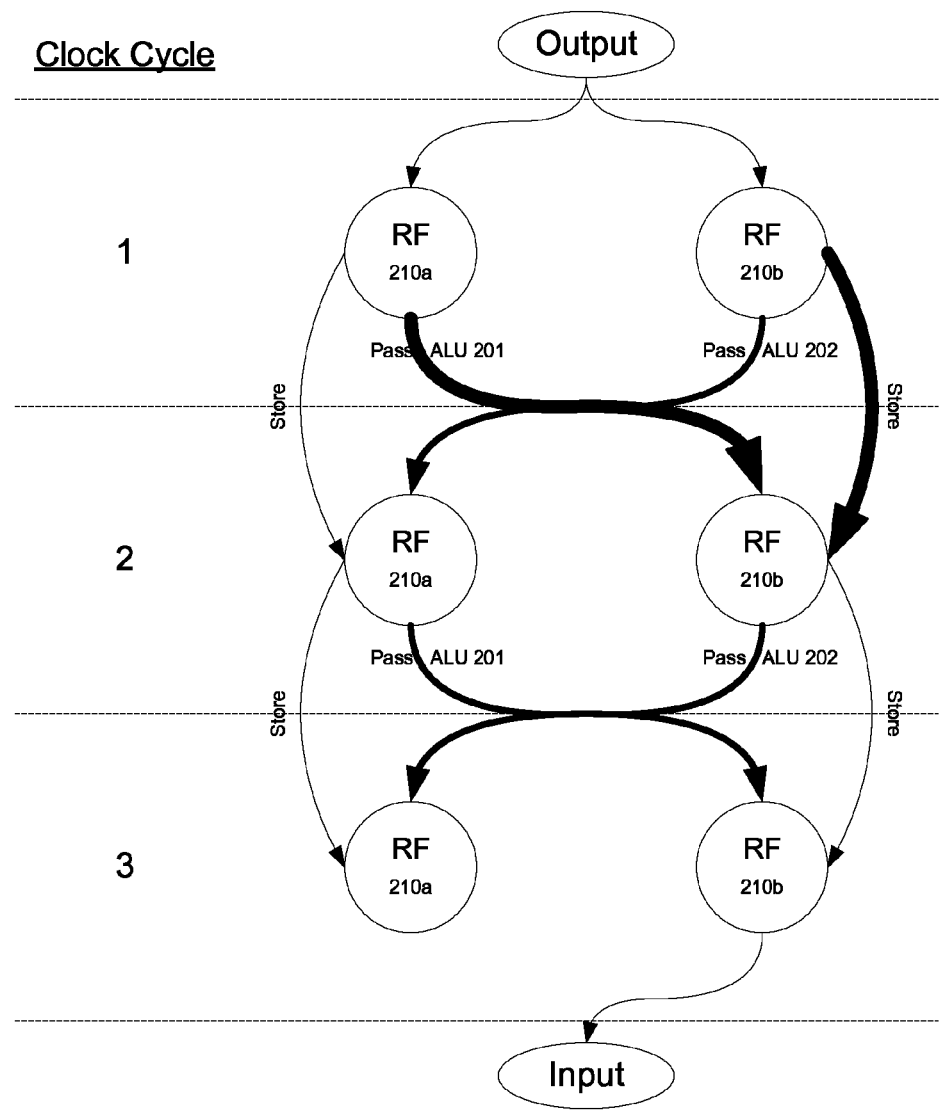
FIG. 9 illustrates a graph for communication scheduling according to another embodiment.

FIG. 9 illustrates a graph for communication scheduling according to another embodiment of the invention. The graph of FIG. 9 is similar to the graph of FIG. 8, with the exception of relative "weights", denoted by the thickness of the edge, given to each of the (pass and store) edges. The assignment of weights to the edges may depend on many different factors, depending on the "cost" or desirability of a given route (e.g. the greater the weight, the less desirable it is to trace that edge). In an embodiment, pass edges are assigned a moderate weight if the corresponding ALU is not in use, or an infinite cost if it is. Performing a pass operations prevents the corresponding ALU from performing a useful operation, thus it may be desirable to avoid such a situation whenever possible. In another embodiment, store edges are assigned a weight based on how full the corresponding register file (RF) is, varying from zero (empty) to infinite (full). It is important to note that tracing a store edge may not always be preferable to tracing a pass edge. For example, a pass operation is always preferable to any alternative that may cause a RF to overflow (e.g. by continuing to store a data value in that RF). In alternative embodiments, other factors or considerations, any combination of which may be included in determining weight assignment. In yet other embodiments, spill edges may be included, having near-infinite weights associated with them.

This is because, in most instances, a spill operation is only desirable when the only alternative is to overflow a RF (i.e. no pass or store edge may be traced without overflowing a RF). In general, (lower) weights on the edges give preference to routes through the graph that avoid resource conflicts, reuse resources for multiple communications of the same output, minimize pass or spill operations, and do not occupy registers in near-full register files. In an embodiment, the weights are updated during the scheduling process to reflect the current schedule state.

An example is herein discussed in reference to the embodiments of FIGS. 5 and 6. Suppose an output of ALU 201 needs to be communicated to an input of ALU 202 after three clock cycles. Recalling the example above, with respect to FIG. 8, there were originally four valid routes for scheduling this communication. However, suppose the compiler knows that RF 210b will be heavily filled at the end of the first clock cycle (as indicated by the thickness of the edges connecting to RF 210b of the second clock cycle). This information alone is sufficient for eliminating three out of four of the possible routes, thus isolating the best route. For example, any routes tracing the data value to RF 210b in the second clock cycle (e.g. the first and third routes of the previous example) may be immediately eliminated, as such would cause RF 210b to overflow. Now only two routing options remain: wherein the data value is either initially stored in RF 210a or in RF 210b during the first clock cycle (e.g. the second and four routes, respectively, of the previous example). If the data value is initially stored in RF 210b during the first clock cycle, it must then be passed, via ALU 202, to RF 210a where it is stored for the duration of the second clock cycle, and then passed again, via ALU 201, to RF 210b where it is stored for the duration of the third clock cycle, so that it can be subsequently input to ALU 202. On the other hand, if the data value is initially stored in RF 210a during the first clock cycle, it may remain in RF 210a for the duration of the second clock cycle as well, before it is ultimately passed, via ALU 201, to RF 210b where it is stored for the duration of the third clock cycle and then input to ALU 202. Note that former route requires two pass operations whereas the latter requires only one. However, pass operations invariably consume resources (e.g. ALUs) which are better served for other, more useful operations. Thus, it is often more desirable to select the route requiring the fewest pass operations. Note, however, that depending on the weights assigned to other (store) edges, this may not always be the case.

Figure 10:
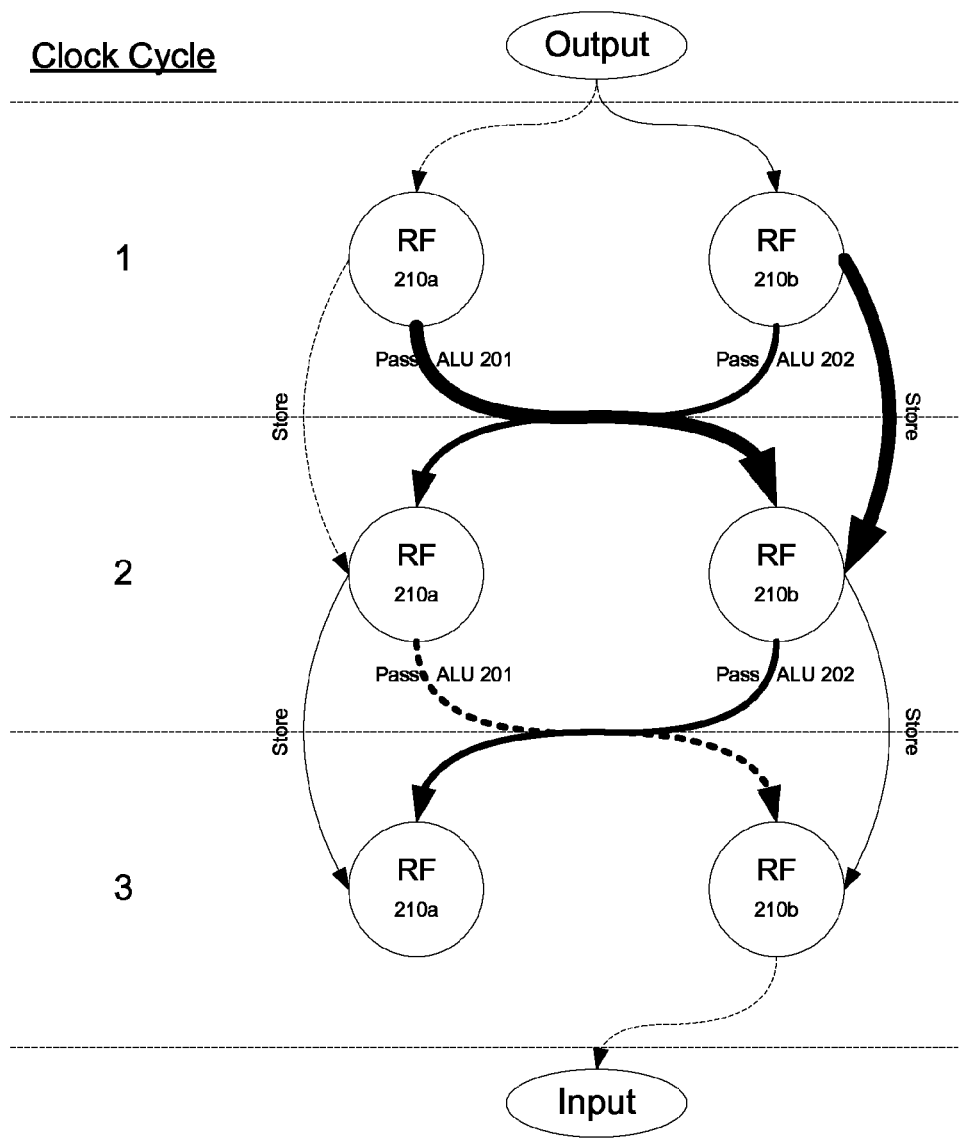
FIG. 10 illustrates a graph for communication scheduling according to yet another embodiment.

By assigning weights to the edges of the graph, the compiler has essentially broken down the problem of finding the best route to an instance of the shortest-path problem. Thus, the compiler has successfully narrowed down the four valid routes in this problem to a single best route, as illustrated in FIG. 10 by a dotted line.

According to one embodiment, the compiler formulates the problem of finding a route for a communication as an instance of the shortest-path problem. This formulation incorporates adding pass operations and spill operations to avoid register file overflows and can be solved optimally in sub-quadratic time. One possible graph underlying the shortest path problem consists of one vertex per register file, for each cycle, plus additional vertices and edges used to describe how values may propagate between register files. For example, a pass operation is modeled as a series of edges and vertices that connects the vertex for a register file on cycle M with a vertex for a crossbar on cycle N=(M+pass latency−1) which is connected to a set of register file vertices on cycle N+1. Weights on the edges may give preference to routes through the graph that avoid resource conflicts, that reuse resources for multiple communications of the same output, that minimize pass or spill operations, and that do not occupy registers in near-full register files. Weights may be updated during the scheduling process to reflect the current schedule state.

Figure 11B:
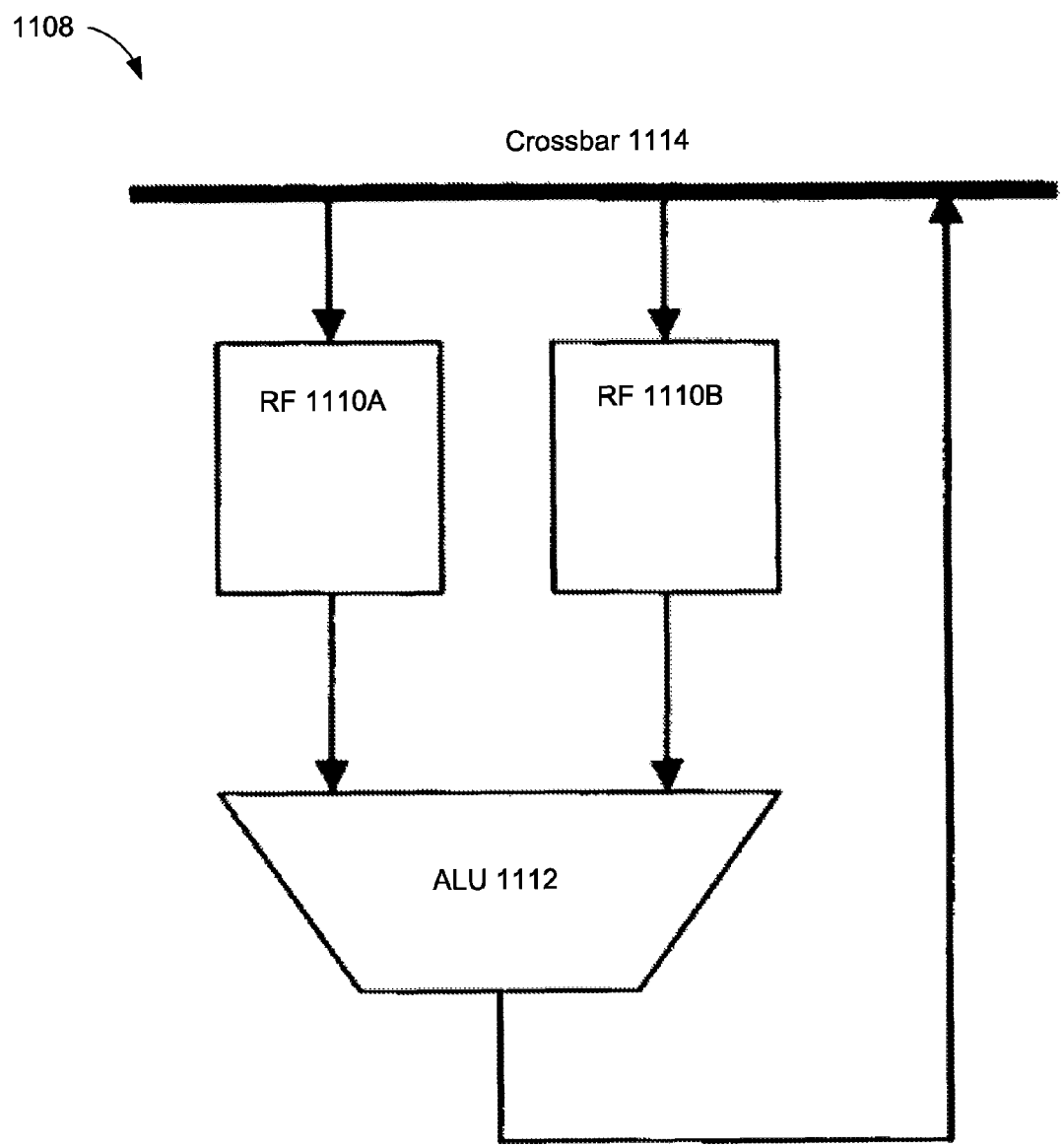
FIG. 11B illustrates yet another embodiment of a processor with multiple register files.

For example, consider scheduling a communication on multiple register file architecture 1108 illustrated in FIG. 11B. The architecture 1108 contains two register files, register files 1110A and 1110B, and one ALU 1112. The ALU 1112 supports a "pass" operation which will read a value from either register file 1110A or register file 1110B and, with two cycles of latency, drive the value onto a crossbar 1114 connected to all register files.

Figure 11C:
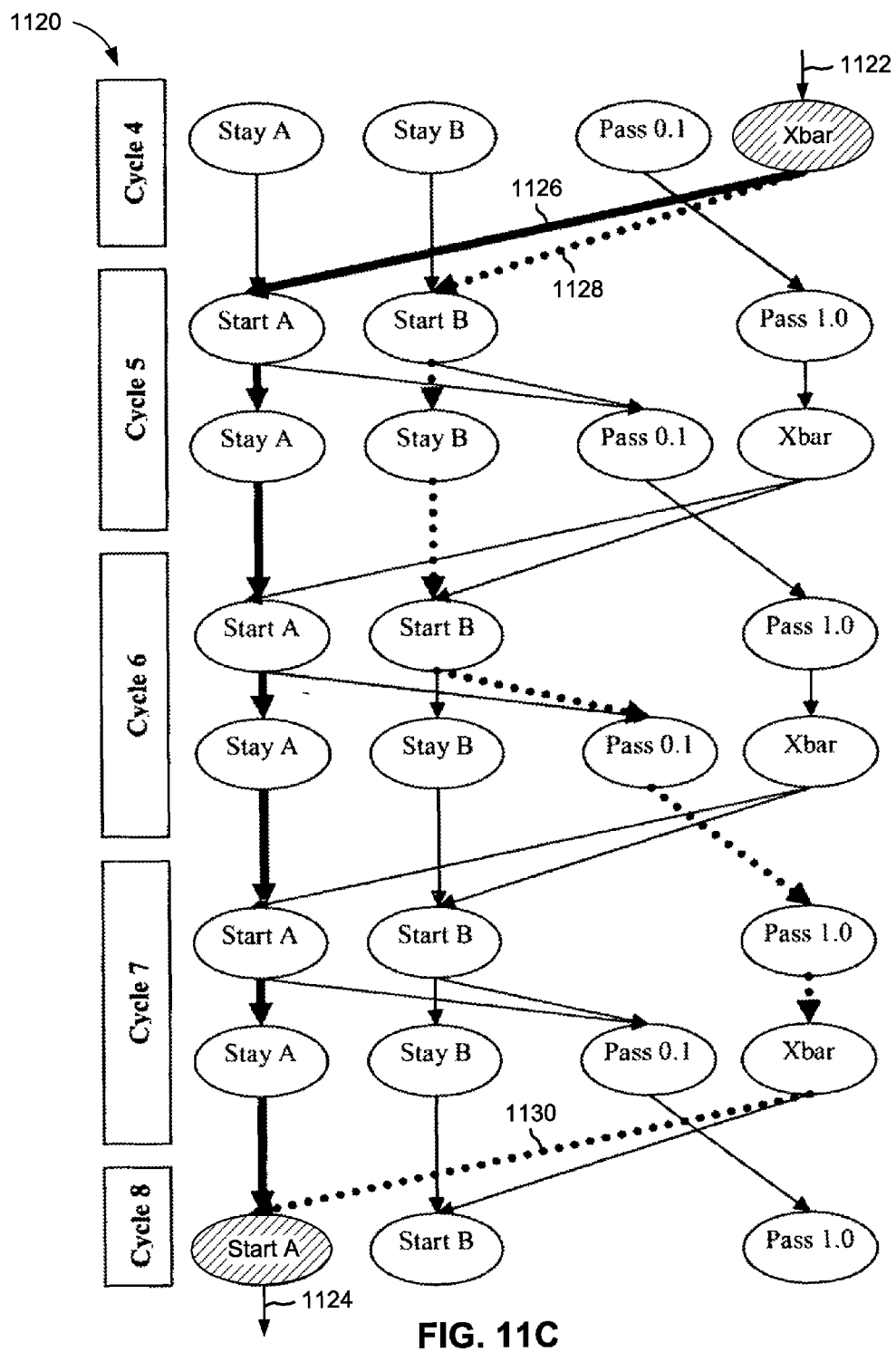
FIG. 11C illustrates a graph for communication scheduling according to still another embodiment.

FIG. 11C shows one possible communication graph 1120 used to schedule a communication on the multiple register file architecture 1108 illustrated in FIG. 11B.

For clarity, the communication graph 1120 is divided into cycles. Each cycle contains two nodes for each register file, a "starts in" node labeled "Start A" or "Start B" and a "stays in" node labeled "Stay A" or "Stay B." Each possible pass operation is represented by a series of nodes connecting a "starts in" node to the crossbar node L, cycles later, where L=(pass latency−1). For example, if the pass latency is 2 cycles, L=1.

The communication illustrated in FIGS. 11B and 11C is from an operation which writes its value onto the crossbar 1114 (depicted as 1122 in FIG. 11C) on cycle 4 to an operation which reads the value as an operand from the register file 1110A (depicted as 1124 in FIG. 11C) on cycle 8. Two possible paths through the graph 1120 are highlighted, one with a solid line and one with a dotted line. The solid line indicates a simple path in which the value is written from the output bus to the register file 1110A (depicted as 1126 in FIG. 11C) and stays in the register file 1110A until used. The dotted line indicates a more complicated path in which the value is initially written to the register file 1110B (depicted as 1128 in FIG. 11C) and then passed to the register file 1110A (depicted as 1130 in FIG. 11C) later. Which path is chosen by the compiler would depend on the weights assigned to the edges. For example, if the register file 1110A was very full, the edges used by the solid path might be too costly. On the other hand, if the output bus was already being used at the end of cycle 7, then the dotted edge from crossbar 1114 on cycle 7 to Start A on cycle 8 (depicted as 1130 in Figure 11C) would have infinite weight, making the dotted path impossible.

In order to ensure that a route can always be found for every open communication, the compiler may use a conservative approximation to track the number of open communications for which routes must eventually be found. The compiler then updates this approximation as it schedules routes for other communications. Any approximation should be capable of ensuring that each output can be written to a register file, each input can be read from a register file, and that pass operations can be used to transfer the data value from the former register file to the later register file. However, different architectures may require different approximations.

In an embodiment, the approximation takes the form: $M*x \leq y$, where M is a constant matrix, x and y are vectors, and $\leq$ is true if and only if all the elements in Mx are less than the corresponding elements in y. Each element of x represents a sum of the number of open communications writing to a given crossbar (ignoring duplicate communications of the same data value). The value of y may vary, depending on which resources are in use during a given clock cycle, and can be stored in a lookup table. The approximation should ensure that an ALU can write the output of a source operation scheduled on it to any register file connected to a crossbar, which is also connected to a register file from which some ALU could read the value and use it as an input of the destination operation. For example, in reference to the processor embodiment of FIG. 9, on a clock cycle with no scheduled routes, the approximation requires the following to be true:

$$\begin{pmatrix} 1 & 0 \\ 1 & 1 \end{pmatrix} * \begin{pmatrix} xA \\ xB \end{pmatrix} < \begin{pmatrix} 2 \\ 4 \end{pmatrix}$$

Where xA corresponds to the number of open communications to register files connected to Crossbar_A (i.e. register files 310a, 310b, 320a, and 320b), and xB corresponds to the number of open communications to register files connected to Crossbar_B (i.e. register files 310b and 320b). Thus, there can be at most two open communications to the register files (310b and 320b) that both ALUs 301 and 302 can write to, and at most four open communications in total. Accordingly, if during the same clock cycle, routes were scheduled that wrote to each of the register files except for register file 320b, it follows that the approximation would then require:

$$\begin{pmatrix} 1 & 0 \\ 1 & 1 \end{pmatrix} * \begin{pmatrix} xA \\ xB \end{pmatrix} < \begin{pmatrix} 1 \\ 1 \end{pmatrix}$$

Note that the vector [2 4] now becomes the vector [1 1], since a route may be found for at most one more open communication.

Efficient Data Loading in a Data-Parallel Processor

Very-long instruction word (VLIW) processors and other data-parallel processors typically include multiple execution units or lanes that execute a shared sequence of instructions to process multiple streams of input data in parallel. VLIW system designers generally seek to maximize efficiency by enabling as many execution lanes as possible to operate on valid data in each execution cycle, a goal achieved primarily by maintaining adequately loaded register files for each of the execution lanes. In many cases, data must be retrieved from scattered locations in main memory and reorganized as it is transferred to the lane register files. Unfortunately, the task of data retrieval and reorganization has historically been left to be carried out on a case-by-case basis by application programmers, often resulting in non-optimal allocation to lane register files and wasted execution cycles.

In various embodiments of the invention disclosed herein, data characteristics are evaluated to generate a set of data descriptors that may be applied, during program compilation or system run-time, to determine an efficient manner of retrieving arbitrarily located data and allocation of the retrieved data to individual execution lanes. The data descriptors may be expressed by programmer-defined constants, run-time variables, or a combination of constants and variables. In one embodiment, program code having constant data descriptors defined therein may be used to identify, at program compilation time and based on the data descriptors, a pattern of data within an expected input data stream. If constant definitions are not sufficient to enable data pattern identification, data patterns may be identified during program execution (i.e., during system run-time) based on variable data descriptors, or a combination of variable and constant data descriptors. In any case, data descriptors may be iteratively evaluated to identify possible data patterns and corresponding data transformations (i.e., data retrieval sequences, also referred to herein as transforms), testing in progression for data patterns that yield more efficient transformations to data patterns that yield less efficient transformations, defaulting to a lowest-efficiency having assured applicability if no higher-efficiency transformations apply.

Once a data pattern is identified and a corresponding data transformation selected, data is retrieved from an input data buffer or other input data source according to the data transformation and loaded into respective lane register files. In one embodiment, for example, the data transformation is effected by generating a sequence of address values that specify, within the larger buffer of input data, respective data substreams to be delivered to each execution lane. By this arrangement, memory accesses may be carried out in the sequence specified by the transformation to retrieve data for each execution lane and to store the retrieved data within the corresponding lane register file.

Figure 12B:
FIG. 12B illustrates an allocation of data retrieved from an input buffer.
Figure 12A:
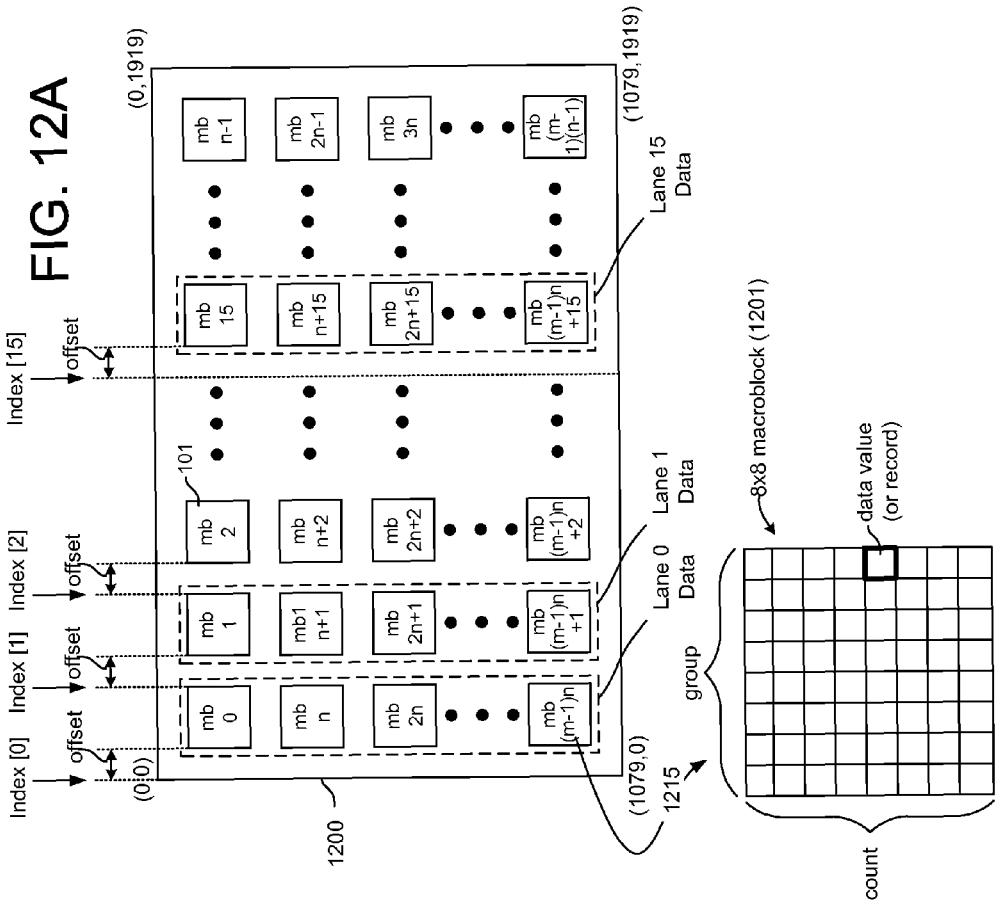
FIG. 12A illustrates an example set of input data and characteristics that may be used to define patterns of parallel data.

FIG. 12A illustrates an exemplary set of input data 1200 and characteristics that may be used to define patterns of parallel data therein. In the particular example shown, the input data represent pixels within a high-definition image (e.g., 1920 columns by 1080 rows of 32-bit pixel values) and is occasionally referred to herein as an input data stream as component values within the data may be received one after another or in groups in a serialized data transmission. Also, within the input data are shown, for purposes of illustration, collections of interesting data 1201 referred to herein as macroblocks or blocks, for short. Assuming, for example, that the input data 1200 includes multiple columns of macroblocks 1201 to be processed within a data-parallel processor having a corresponding number execution lanes, and further that identical processing operations are to be carried out for each of the macroblocks 1201, it becomes desirable to retrieve the constituent data for each macroblock and load the retrieved data into the lane register file for a corresponding execution lane. More specifically, as indicated by the designations "Lane 0 Data," "Lane 1 Data," . . . , "Lane 15 Data," the macroblocks in the leftmost column may be delivered to execution lane 0, with the macroblocks in columns 1-15 similarly delivered to execution lanes 1-15, respectively. Unfortunately, the sequence of memory accesses required within the input buffer (also referred to herein as a main memory or source buffer) to retrieve a given macroblock is not, at least in this example, a linearly progressive sequence. Rather, each macroblock 1201 may be offset from an adjacent macroblock (or from a starting address within the input buffer), and may include distinct non-contiguous groups of contiguously stored data values or records (note that the term 'contiguous' is used herein to express storage locations addressed by consecutive address values). Even more generally, each macroblock 1201 may be stored at an arbitrary (rather than systematic) location within the input buffer. Accordingly, in one embodiment, data descriptors that are used to parameterize or describe a set of input data include, but are not limited to:

| Descriptor | | Example in FIG. 12A |
|---|---|---|
| Offset | Offset between implicit or explicit reference point within input buffer and start of data | Offset between index and start of macroblock |

| Descriptor | | Example in FIG. 12A |
| --- | --- | --- |
| Count | Number of non-contiguous memory accesses required to retrieve data sub-stream (number of Groups) | Height of macroblock |
| Group | Number of contiguous locations to be accessed for each count | Width of macroblock |
| Stride | Address step between groups within same data sub-stream | Row length (1920 in this example) |
| Index | Explicit reference point for start of data sub-stream | Indices for each of macroblocks for lanes 0-15 |

In the context of input data 1200, for example, the 'group' parameter specifies the width of a macroblock 1201 (pixel values in 16 adjacent columns), the 'count' parameter specifies the height of a macroblock (16 pixel values in adjacent rows as shown in detail view 1215), the 'stride' parameter specifies the step from group to group within a given macroblock (i.e., the row length of the input buffer, or 1920 in this example), and the 'index' parameter includes or points to one or more index values that establish reference points which, when summed with the 'offset' parameter, specifies the start of respective macroblocks.

Another data descriptor, referred to herein as the transpose, indicates the number of consecutively retrieved data values to be loaded into each lane register file before advancing to the next lane register file. FIG. 12B, for example, illustrates allocation of data retrieved from the input buffer of FIG. 12A when the transpose value is sixteen, the same as the group value. More specifically, assuming that there are also sixteen lane register files, LRF0-LRF15, the first group of sixteen data values retrieved from the input buffer (i.e., from addresses 0-15) are stored in LRF0, the second group of sixteen values retrieved from the input buffer (i.e., from locations 16-31) are stored in LRF1, and so forth to the sixteenth group of sixteen data values (i.e., retrieved from buffer locations 240-255) which are stored in LRF15. Thereafter, the data retrieval and register-file load operations are repeated after striding to the next sixteen groups of data values (from buffer locations 1920-1935, 1936-1951, . . . 2160-2175), and then the retrieval and load operations are repeated another fourteen times to load data for the first sixteen macroblocks into the lane register files. By this arrangement, each of sixteen execution lanes may be supplied with a respective one of sixteen macroblocks of data that span a portion of a macroblock row within the input buffer, without requiring application-level programming of the precise sequence of buffer reads and register-file loads. After each set of sixteen macroblocks has been processed by the execution lanes (or whenever the lane register files have been sufficiently drained to provide room for loading or starting to load the next set of macroblocks), the second set of sixteen macroblocks may be retrieved from the input buffer (advancing to left-to-right to the next column of sixteen macroblocks within the same row, or advancing top to bottom to the next row of sixteen macroblocks within the same column.

FIG. 13 illustrates a generalized sequence of operations that may be performed to retrieve data stored at arbitrary locations within an input buffer and load the retrieved data into the lane register files of a VLIW or other data-parallel processor. Initially, the data is characterized according to a pattern-describing subset of the data descriptors (i.e., pattern descriptors), including, for example, the offset, count, group, stride and index parameters described above. The data characterization may take place at program development time, for example, by recording constant values for offset, count, group, stride and/or index. Alternatively, data may be characterized at program run-time, for example, by evaluating the data to discern trends or other indications of data format or organization. Also, characterizations of the data may be received from an external source, for example, in the form of packet header information or other information received separately from the data itself, but that indicates data format or organization. However determined, run-time data characterization may be recorded in variable pattern descriptors that are applied in absence of (or instead of or as supplements to) statically defined pattern descriptors.

Whether statically or dynamically determined (or some combination thereof), the pattern descriptors are applied at 1303 in conjunction with another subset of the data descriptors (or a single data descriptor) that defines an allocation of retrieved data to individual execution lanes (i.e., one or more lane allocation descriptors, such as the transpose parameter discussed above). For example, lane allocation descriptors may be applied in conjunction with constraints of the underlying hardware set to determine which of multiple applicable data patterns (determined by the pattern descriptors) will result in the most efficient delivery of data substreams to the individual execution lanes. Thereafter, at 1305, a sequence of input-buffer addresses is generated according to the identified pattern, to specify a collection of data referred to herein as the transformed data. At 1307, the transformed data is loaded directly into the lane register files or into a temporary buffer before being loaded into the lane register files, with the data being distributed among the lane register files in either case according to lane allocation descriptor at 1307.

Still referring to FIG. 13, an exemplary data transformation operation that corresponds to the general transformation operation at 1305 is shown at 1309. In the particular embodiment shown, a function "spi_load" is invoked along with parameters that include a source buffer pointer, 'srcb' (e.g., pointer to an input buffer 1311), pattern descriptors (offset, count, group, stride and indices) and a lane allocation descriptor (transpose), and executed to generate a data transformation 1312 that may be applied to retrieve parameter-specified data values (or records) from the source buffer. In the particular example shown, the offset parameter is zero, the count is 48, the group is one, and the stride is four, meaning that a data substream may be extracted from the input buffer by retrieving 48 groups of one data value each, with a stride of four from group to group. The index parameter is null, meaning that there are no indices and thus only one data substream to be retrieved for a given input data set (or at least per invocation of the spi_load function). Thus, referring to the data transformation 1312 (i.e., the sequence of contiguous addresses from which data is retrieved to form the transformed data set), forty eight data values are retrieved from input buffer locations 0, 4, 8, . . . , 184, 188 (the final location being (count-1)*stride+ (group-1), where '*' denotes multiplication) to form the transformed data set. An exemplary loading of transformed data into a set of sixteen lane register files L0-L15 (i.e., a specific case of the more general load operation at 1307) is illustrated at 1310. As shown, with a transpose of 3, each contiguous set of three data values specified by the data transform is loaded into a respective and progressively higher numbered one of the lane register files. That is, records from the first three source buffer locations specified by the data transform (i.e., source buffer locations 0, 4, 8) are loaded into L0, values from the next three source buffer locations specified by the data transform (i.e., locations 12, 16, 20) are loaded into L1 and so forth to LR15 which receives values from the final three source buffer locations specified by the data transform (i.e., locations 180, 184, 188). As with other examples herein, the specific parameters, parameter values, number of lane register files and so forth are provided for purposes of illustration only and may be varied in alternative embodiments.

FIGS. 14A-14C illustrate further uses of data descriptors to characterize data to be retrieved from an input data buffer (or input data stream). FIG. 14A, for example, shows the use of the offset, group and count descriptors to specify a data substream stored at sixteen contiguous locations (i.e., locations 7-22) within an input buffer. That is, the offset is seven, the group size is one, and the count (the number of groups) is sixteen, thus specifying input buffer storage locations 7-22 as the source of the data substream. FIG. 14B provides another example, in this case a data substream formed by two groups of eight data values each (i.e., count=2, group=8). As shown, a stride of ten is used to advance from the start of one group to the start of the next group within the data substream, but no offset (stride=10, offset=0). FIG. 14C illustrates another example of a data substream formed by eight groups of four data values each (count=8, group=4), with no offset and a stride of eight between the start of adjacent groups (stride=8, offset=0). FIG. 14C further demonstrates the allocation of the data substream to a data-parallel processor having sixteen execution units and sixteen corresponding lane register files (L0-L15). More specifically, a transpose of 2 is specified so that each four-record group is split between adjacent register files. That is, records from locations 0-3 of the first group are split 0,1 and 2,3 between lane register files L0 and L1, respectively; records from locations 8-11 of the second group are split 8,9 and 10,11 between lane register files L2 and L3, respectively and so forth to lane register files L14 and L15, which receive records 56,57 and 58,59, respectively, of the eighth group.

FIG. 15 is a table of exemplary data patterns and their descriptor characteristics. When applied in conjunction with a given hardware set, the data patterns from 1 to 10 constitute a pattern hierarchy that yield progressively less efficient processing. Thus, in one embodiment, data descriptors for an input data stream are iteratively compared with the characteristics (or conditions) defined for each data pattern in the table (referred to herein as a pattern hierarchy table 1500), starting with data pattern 1 and progressing toward data pattern 10 until a data pattern that fits the data descriptors is identified. To ensure that data of interest may be successfully loaded into lane register files in all instances, data pattern 10 is a degenerate case that corresponds to patternless data and so may be used with any arbitrary data arrangement. Accordingly, if the incoming-data descriptors fit none of the more ordered data patterns 1-9, data pattern 10 is applied as a fail-safe to ensure that the data may be processed. By contrast, as the data descriptors are iteratively tested against the conditions set forth for patterns 1-9, the testing may be halted as soon as a match is found, and the descriptor-matching data pattern applied to produce the data transform.

The particular conditions set forth in the pattern-hierarchy table of FIG. 15 are further described below in the context of particular data patterns. It should be noted that the pattern-hierarchy conditions are provided for example only, however, and generally result from limitations in the underlying hardware set. Consequently, different hardware sets having different limitations may include different conditions and also more or fewer conditions and/or numbers of hierarchical data patterns.

Following the column order in the pattern hierarchy table 1500, the "Zero-valued transpose" condition is met when the transpose parameter is zero (patterns 7, 8 and 9 only), and is a special case indicating that the same data substream is to be loaded into each lane register file of the data-parallel processor. In one embodiment, the "Indexed data" condition is met whenever the index parameter is non-null. A non-null index parameter indicates that there are one or more indices (e.g., recorded statically as a number of indices and their values, or dynamically in a linked list or other structure that allows a variable number of indices to be specified or determined) that correspond to respective data substreams. The "Integral groups per transpose" condition is met when the transpose parameter is an integer multiple of the groups parameter (i.e., transpose % group=0, where '%' denotes a modulus operation). "Integral transposes per block" is met when there are an integral number of transposes per block (i.e., (count*group) % transpose=0, where '*' denotes multiplication), "Stride equal group" is met when the stride and group are equal, "Transposes per group equal 2''" is met when there are 2" transposes per group (i.e., 1, 2, 4, 8, etc., up to some hardware supported limit), and, similarly, "Transposes per block equal 2''" is met when (count*group)/transpose=2".

FIG. 16 is a pseudocode listing of an exemplary set of data retrieval, transformation and register load operations carried out by a register load function, "spi_load". As discussed in further detail below, the actual hardware operations performed to effect the data transfer may differ from the generalized set of operations set forth in the pseudocode listing, but generally effect the same data transfer result. As shown, the data transfer starts with a FOR loop at line 110, looping through each index in the linked list (or other data structure) pointed at by the 'indices' parameter. Within the FOR loop, at line 120, a starting location within the input buffer is established by adding the current value of index (in the first iteration, the first index in the list) to the 'offset' parameter. At line 130 a nested loop is begun, to be repeated a number of times according to the 'count' parameter. In each pass through the nested loop, 'group' records are selected (line 140) before advancing an input-buffer pointer (i.e., an address value that points to the next input-buffer location from which a record is to be retrieved) by 'stride' records (150). The nested loop is concluded at line 160 and the outer FOR loop is concluded at line 170. Starting at line 200, the records selected in lines 110-170 are distributed to the execution lanes. That is, while selected records remain (per the While loop at line 200), a nested For loop is begun at line 210 to load a number of records according to the 'transpose' parameter into the register file for each execution lane (line 220). The For loop is concluded at line 230 and the While loop at line 240.

FIG. 17 is a flow diagram illustrating the manner in which programmatically determined parameters (i.e., parameters determined through software execution or defined statically as constants to be applied during software execution) may be applied to generate hardware parameters for carrying out the data transfer from a system memory or other input data source to lane register files. At 1751, one of N different data patterns is identified based on the programmatically determined parameters (i.e., the software parameters). This operation may be performed as described in reference to FIG. 15 by iteratively testing the software parameters against sets of conditions to select a data pattern with which the software parameters comply and which yields more efficient processing than other data patterns with which the software parameters may comply. At 1753, the software parameters are translated into hardware parameters based on the identified pattern. That is, viewing the software parameters as a virtualization of the underlying hardware set (i.e., corresponding to an idealized or generalized hardware set), the software parameters may include one or more parameters that do not exist in the actual hardware, but that may be translated into one or more hardware-supported parameters, referred to herein as hardware parameters, to control hardware operation. At 1755, the hardware parameters are loaded into a state machine or other circuitry for carrying out memory access operations, referred to herein as a memory access engine (MAE). In one embodiment, the memory access engine includes circuitry for generating a sequence of memory addresses in accordance with the data pattern parameters and controlling transfer of data between each memory address in the sequence and the lane register files in accordance with the lane allocation parameter (transpose). More specifically, the memory access engine includes circuitry to generate a sequence of addresses and register load signals in accordance with the hardware parameters derived from counterpart software versions of data pattern parameters and lane allocation parameters. At 1757, the memory access sequence is initiated within the memory access engine to transfer data from system memory into the lane register files.

FIG. 18 illustrates an embodiment of a memory access engine 1875 that includes registers 1877 (or fields within a unified register) for storing hardware parameters and a finite state 1879 machine for generating a sequence of input buffer addresses (IBAddr) and register-file enable signals (le0-le4) in response to the hardware parameters. In one embodiment, the registers 1877 include a record length register 1881, group register 1883, stride register 1885, offset register 1887 and set of index registers 1889. The record length register 1881 provides storage for a hardware record length value (hw_reclen) that indicates the number of contiguously stored records (i.e., stored at sequential addresses in an input buffer or system memory) that are to be loaded into a given lane register file before advancing to load the next lane register file. The group register provides storage for a hardware group value (hw_group) that indicates the number of lane register files to be loaded with hw_reclen records before either striding the input buffer address according to a hardware stride value (hw_stride) or stepping to the next hardware index (hw_index) at the head of a queue formed by registers 1889. The offset register 1887 provides storage for an offset value (hw_offset) that is added to each newly selected hardware index to generate an input buffer address. As shown, in one embodiment, the hardware record length, hardware stride and hardware offset registers (1881, 1885, 1887) are loaded with the software transpose, stride and offset parameters, respectively, and the hardware group register 1883 is loaded with a value determined by dividing the software group parameter by the software transpose parameter, an operation that may be performed within additional hardware circuitry dedicated to that purpose or a programmed processor.

The pseudocode listing at 1895 illustrates, in this example in the C programming language, a manner of loading the hardware index registers 1889 with values determined from the software indices. In the particular implementation shown, an outer FOR loop is executed iteratively according to the number of software indices (i.e., incrementing an initially zero-valued loop variable, 'i', until the loop variable is no longer less than the number of software indices). Within the outer FOR loop, a temporary address variable, 'c', is assigned the $i^{th}$ value of the software index (i.e., c=index[i]), and then an inner FOR loop is executed iteratively according to the number of groups per index (i.e., incrementing an initially zero-valued loop variable 'j', until the loop variable is no longer less than the software parameter, "count"). Within the inner FOR loop, the value of the temporary address variable is loaded into the index register indicated by a hardware index count value (initially zero to point to head-of-queue register hw_index0), and then the temporary address variable is incremented by the software stride parameter and the hardware index count incremented so that the software index plus software stride is recorded in the next index register location (e.g., hw_index1). By this arrangement, a pointer to each software-specified group is stored within a respective index register as a hardware index. In one embodiment, the hardware index registers are operated as a shift register having a tail register (i.e., which holds the most recently loaded hardware index) and a head register (e.g., hw_index0, which holds the least recently loaded hardware index) and logic to shift the entries from one register to the next, advancing from tail register to head register in response to an advance signal 1890 (adv) from the finite state machine 1879. By this arrangement, the finite state machine 1879 may step through a sequence of hardware indices associated with a given data substream.

The finite state machine 1879 includes inputs to receive the hardware record length, hardware group, hardware stride, hardware offset and hardware index values from registers 1877, and outputs to output an input buffer address (IBAddr, which may be maintained as a state variable within a register 1893 of the finite state machine 1879) and load-enable signals, le0-le4, to each of five lane register files (there may be more or fewer lane register files and thus more or fewer load-enable signals in alternative embodiments), to enable retrieved data to be stored therein. FIG. 19 is an exemplary pseudocode description of the operations of the finite state machine of FIG. 18 in response to a triggering signal 1892 (Enable), illustrating a manner of transferring data from the system memory to the lane register files. At line 110, loop variables i, j and k, which are used to specify the current lane register file, offset relative to the current input buffer address, and hardware index, respectively, are initialized to zero. At line 120, the hardware index count (the number of hardware indices as determined, for example, in the operations shown in FIG. 18 at 1895) is evaluated to determine if any hardware indices for the current data substream have been loaded into the hardware index registers. If the hardware index count is zero (no hardware indices), then the data substream consists of non-indexed data, and the operations shown in lines 130-230 are executed to complete the register file load operation. If there are hardware indices (i.e., hardware index count>0), the data substream is indexed, and the operations shown in lines 250-370 are executed to complete the register file load.

Turning first to the load operations for non-indexed data, at line 130, the input buffer address is assigned the value of the hardware offset. Then, at line 140, a loop is established to iteratively execute the operations at lines 150-220 so long as the lane register file is not full. More specifically, at line 150, a first nested loop is begun to repeat execution of lines 160-200 a number of times according to the hardware group parameter. At line 160 a second nested loop is begun to repeat execution of the operations at lines 170 and 180 according to the hardware record length. By this arrangement, the operations at lines 170 and 180 are repeated hw_group*hw_reclen times ('*' denoting multiplication), with a record (or data value) being retrieved from the input buffer (or system memory or main memory) at the location specified by the input buffer address plus the relative offset value 'j' within the current hardware group (e.g., initially the hardware offset, then the hardware offset plus 1, 2, 3, . . . etc.) and loaded into the lane register file specified by loop variable 'i'. At line 180, the relative offset, 'j' is incremented to select the next record number. When hw_reclen number of records have been retrieved from the input buffer and loaded into the current lane register file, the second (inside) nested loop is completed at line 190, and the next lane register file is selected by incrementing the register file index, 'i' at 200. Thereafter, the next hw_reclen number of records are retrieved from the input buffer loaded into the newly selected lane register file in another repetition of the nested loop between lines 160 and 190. This operation is repeated according to the number of hardware groups before the first nested loop (begun at line 150) is concluded at lines 210. At line 220, the input buffer address is advanced by the hardware stride value, thus selecting the next set of memory locations within the input buffer from which data is to be retrieved and loaded into the next set of lane register files.

FIG. 20A illustrates an exemplary register file load operation effected by the operations at lines 130-230 of FIG. 19 (i.e., loading non-indexed data), including the relationship between software parameters 2011 and the corresponding hardware parameters 2013 that may be loaded into the hardware registers of FIG. 18. In the particular example shown, the software offset=2, group=4, count=8, stride=6 and transpose=2, so that hw_offset=2, hw_reclen=2, hw_group=2, and hw_stride=6. Consequently, data is loaded into the eight lane register files as shown at 2015.

Figure 20B:
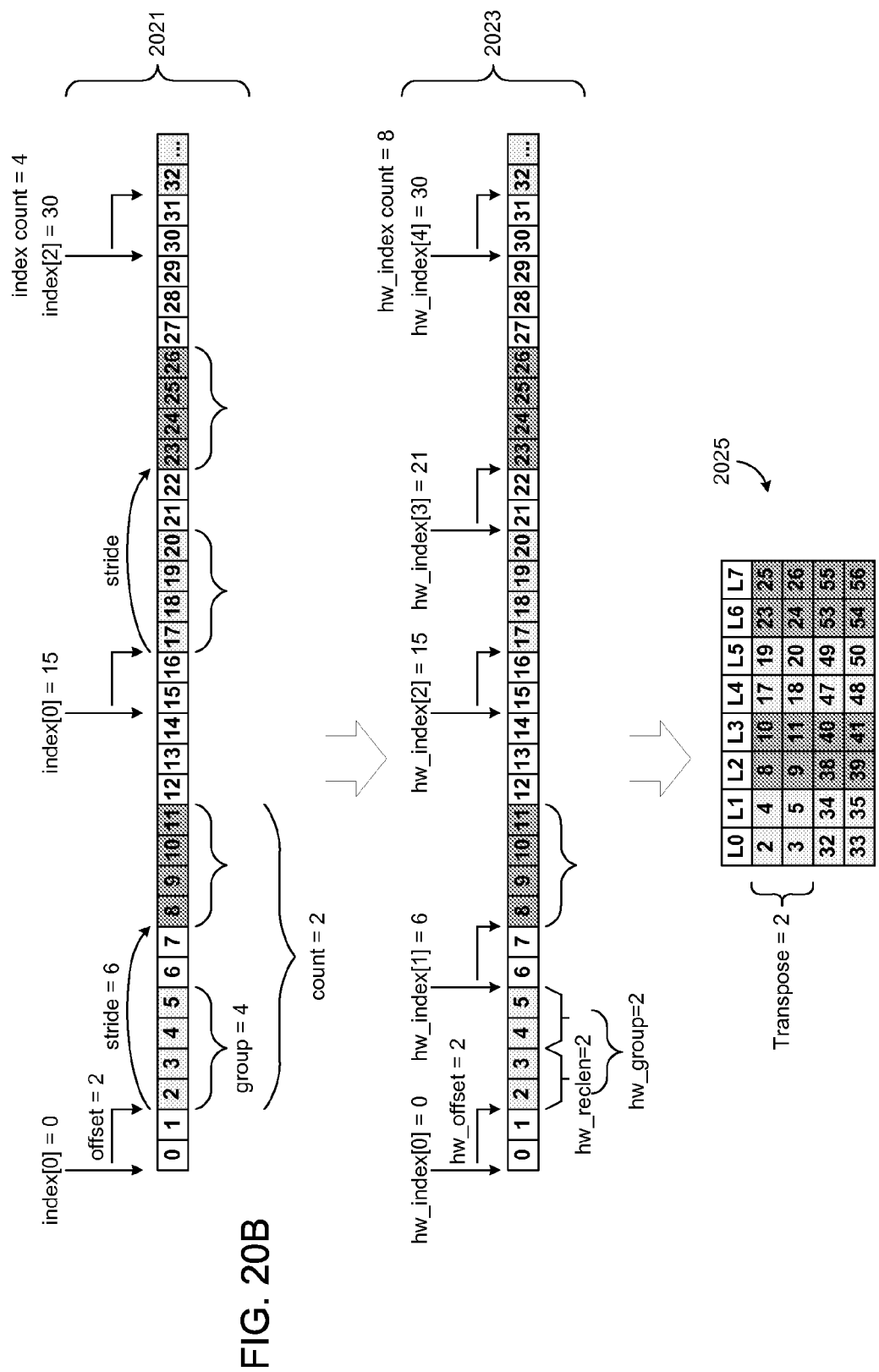
Figure 21A:
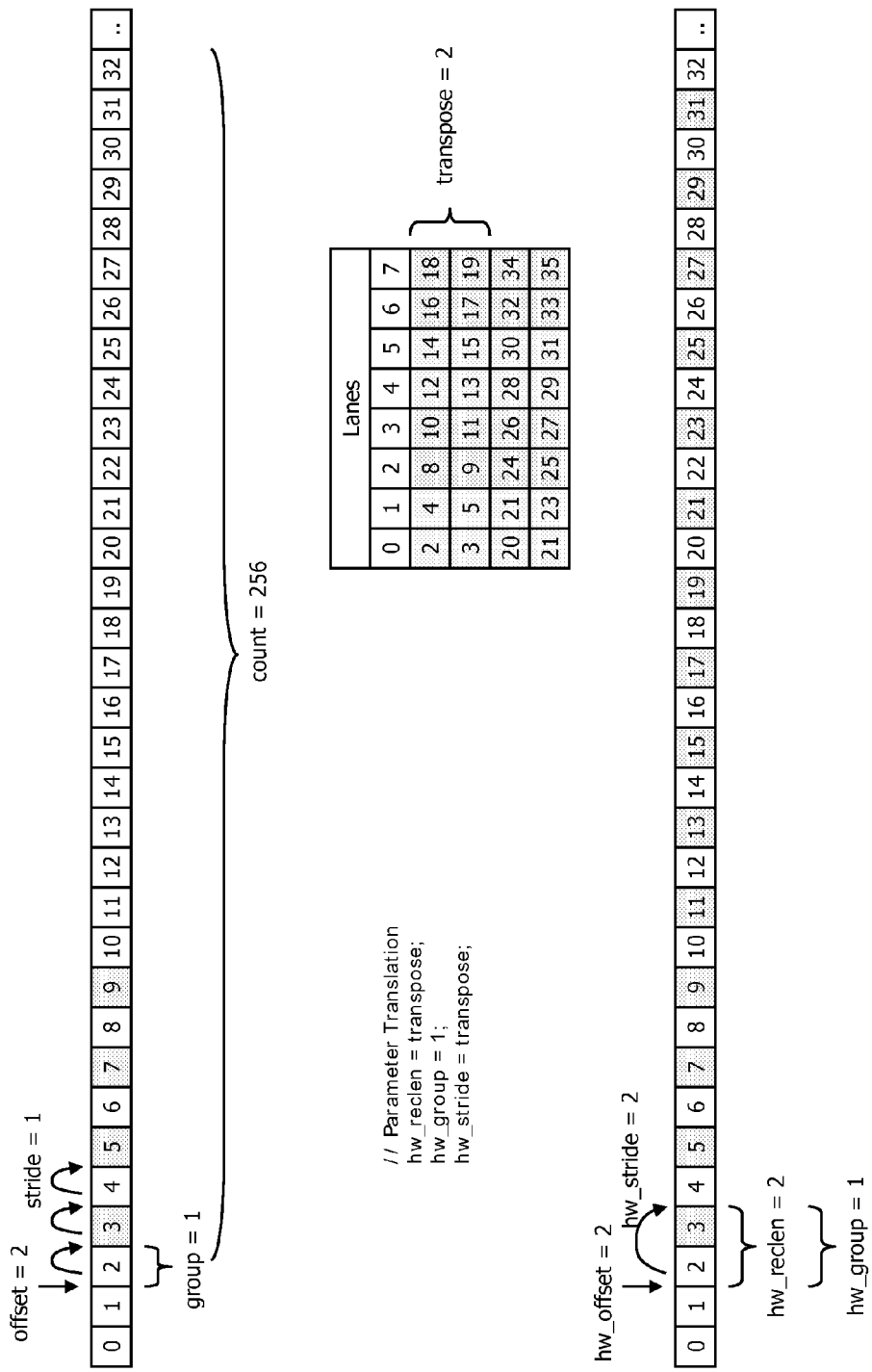
FIGS. 21A-21J illustrate parameter translations according to various embodiments.
Figure 21B:
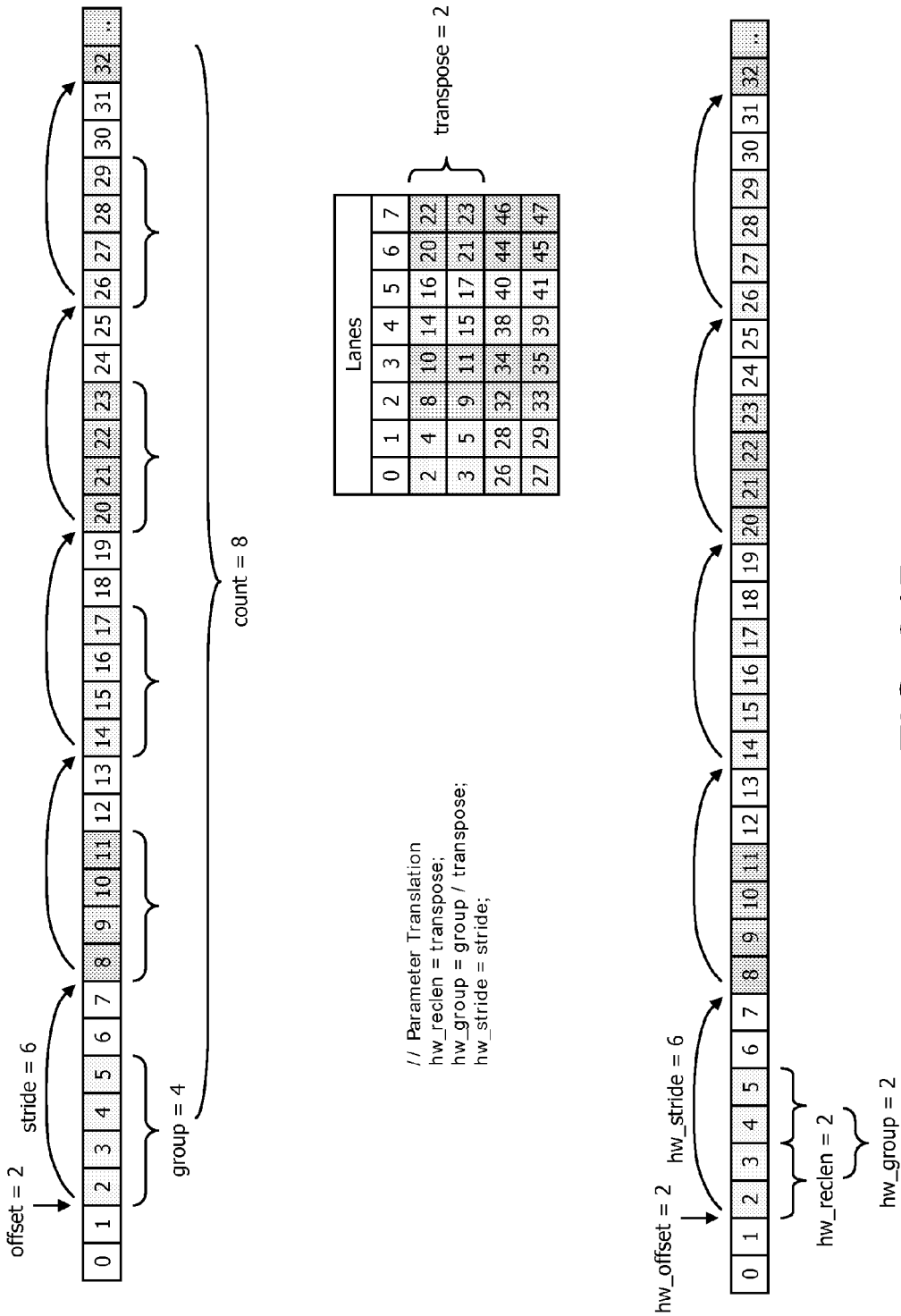
Figure 21C:
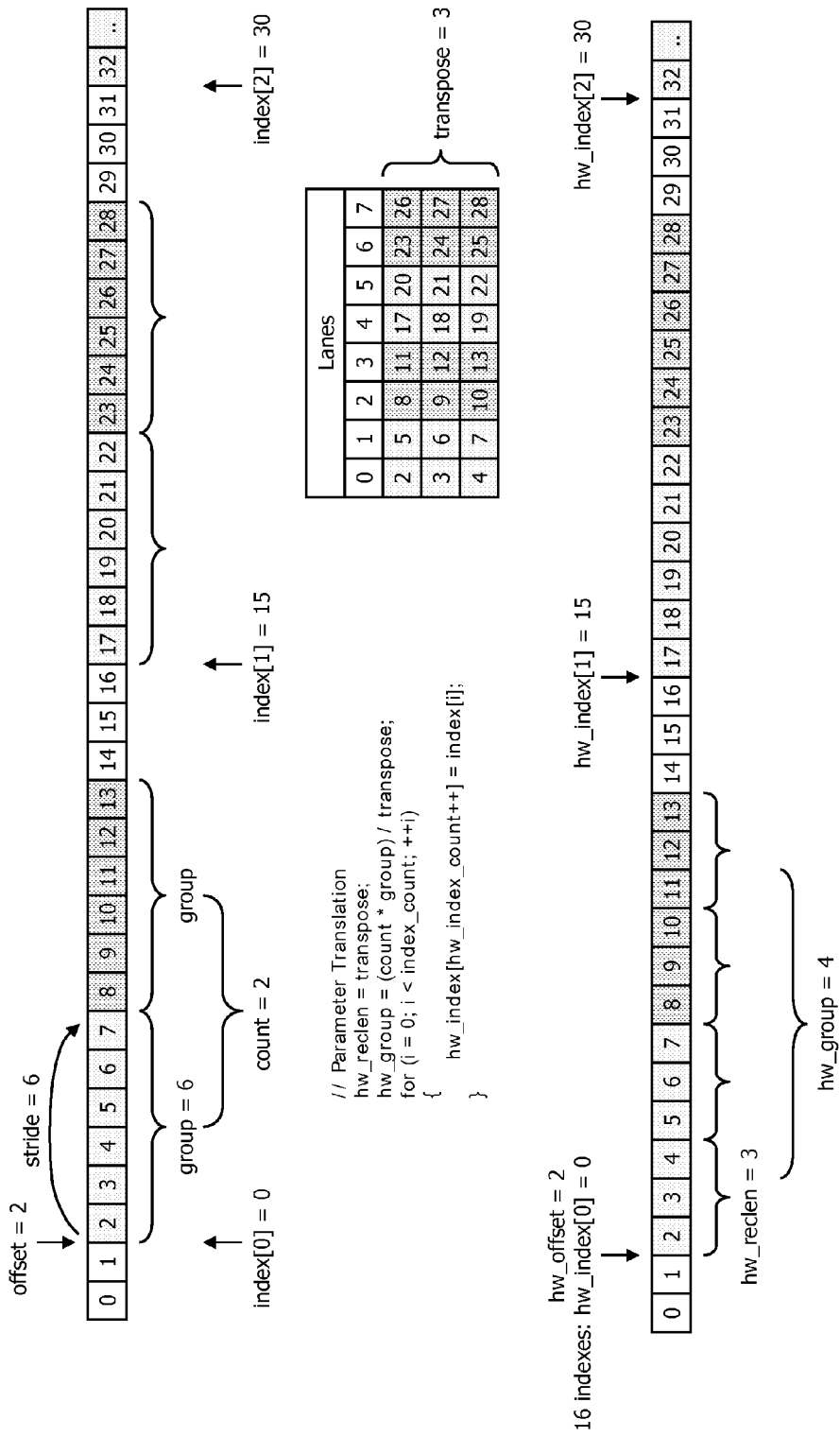
Figure 21D:
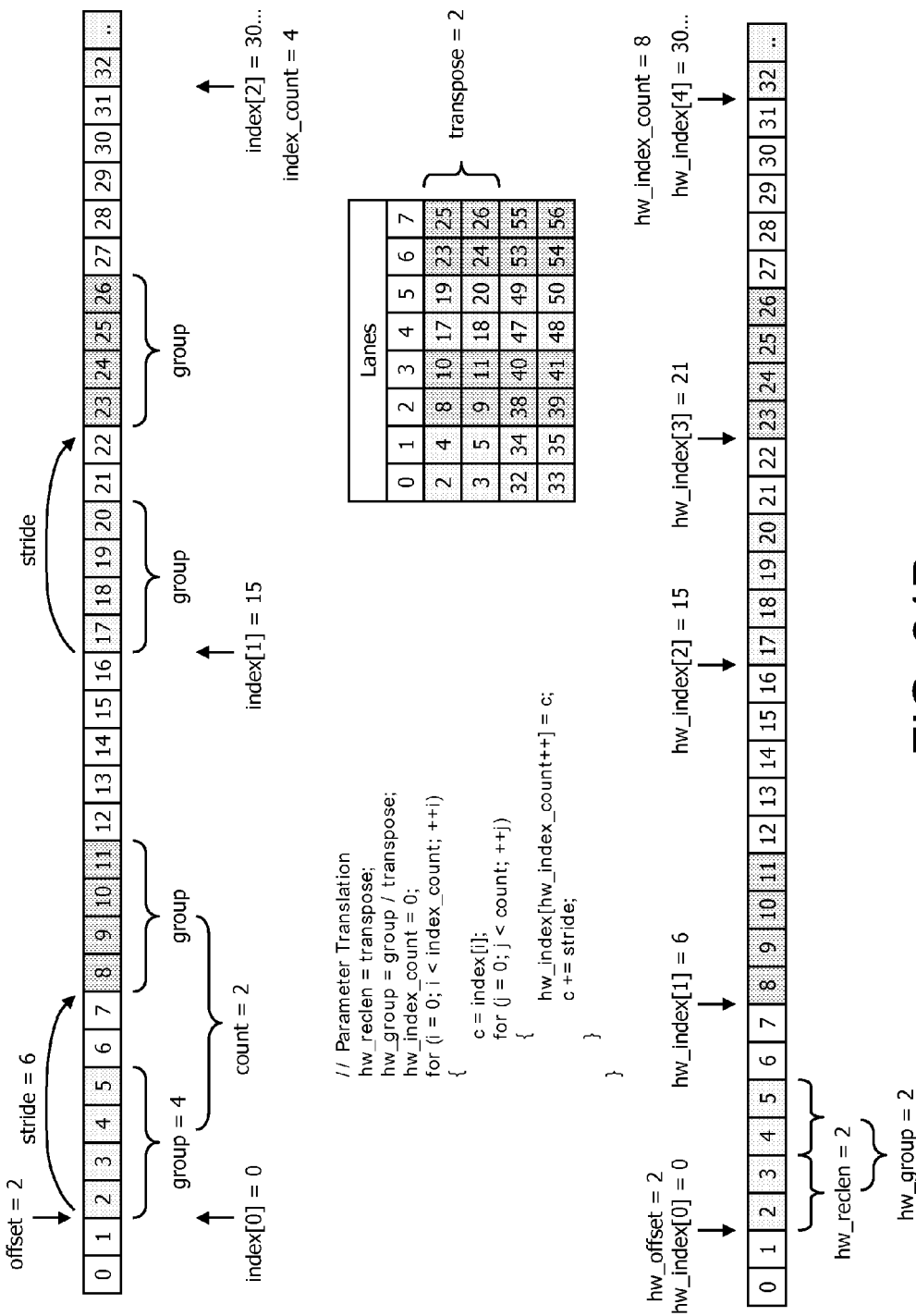
Figure 21E:
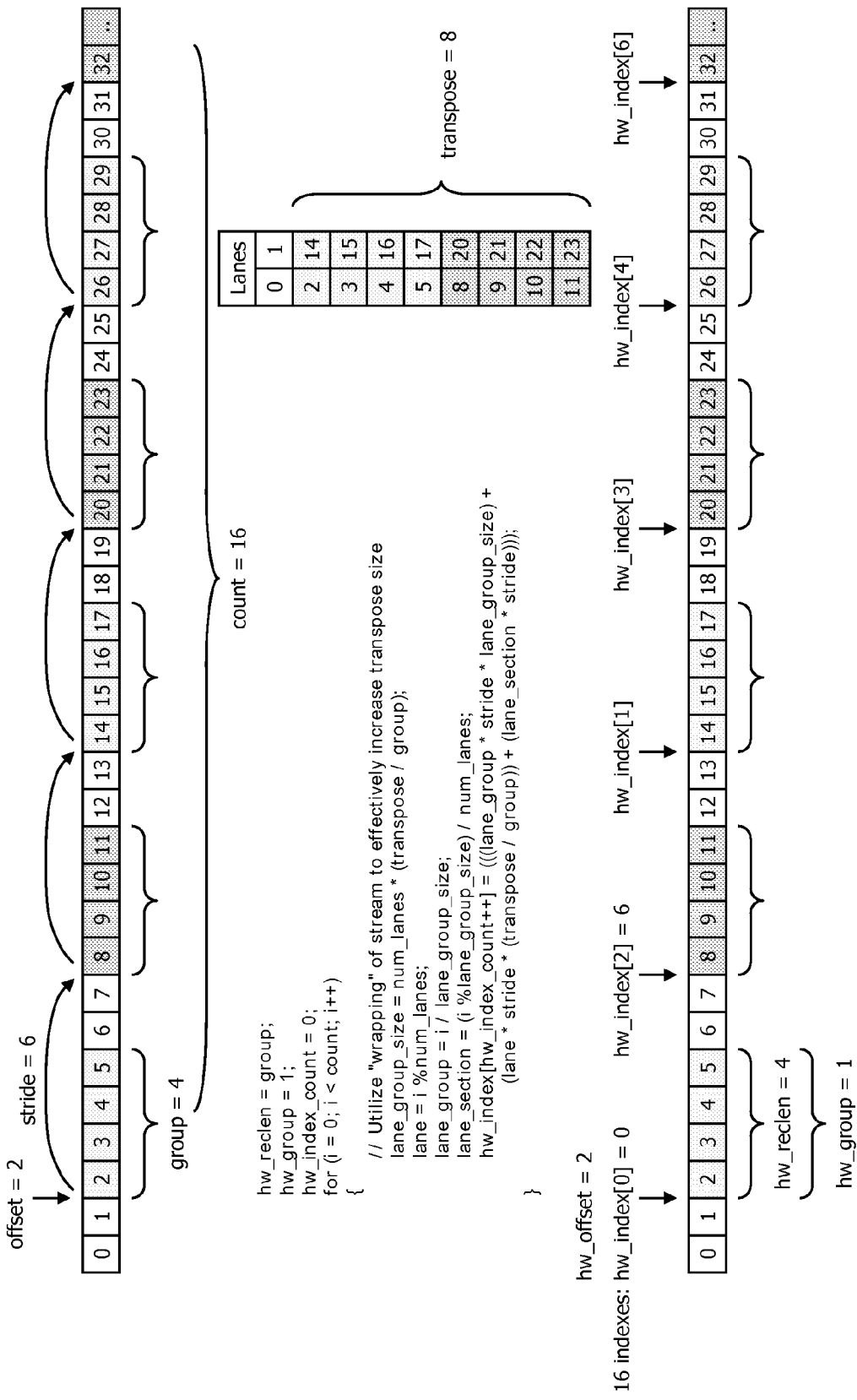
Figure 21F:
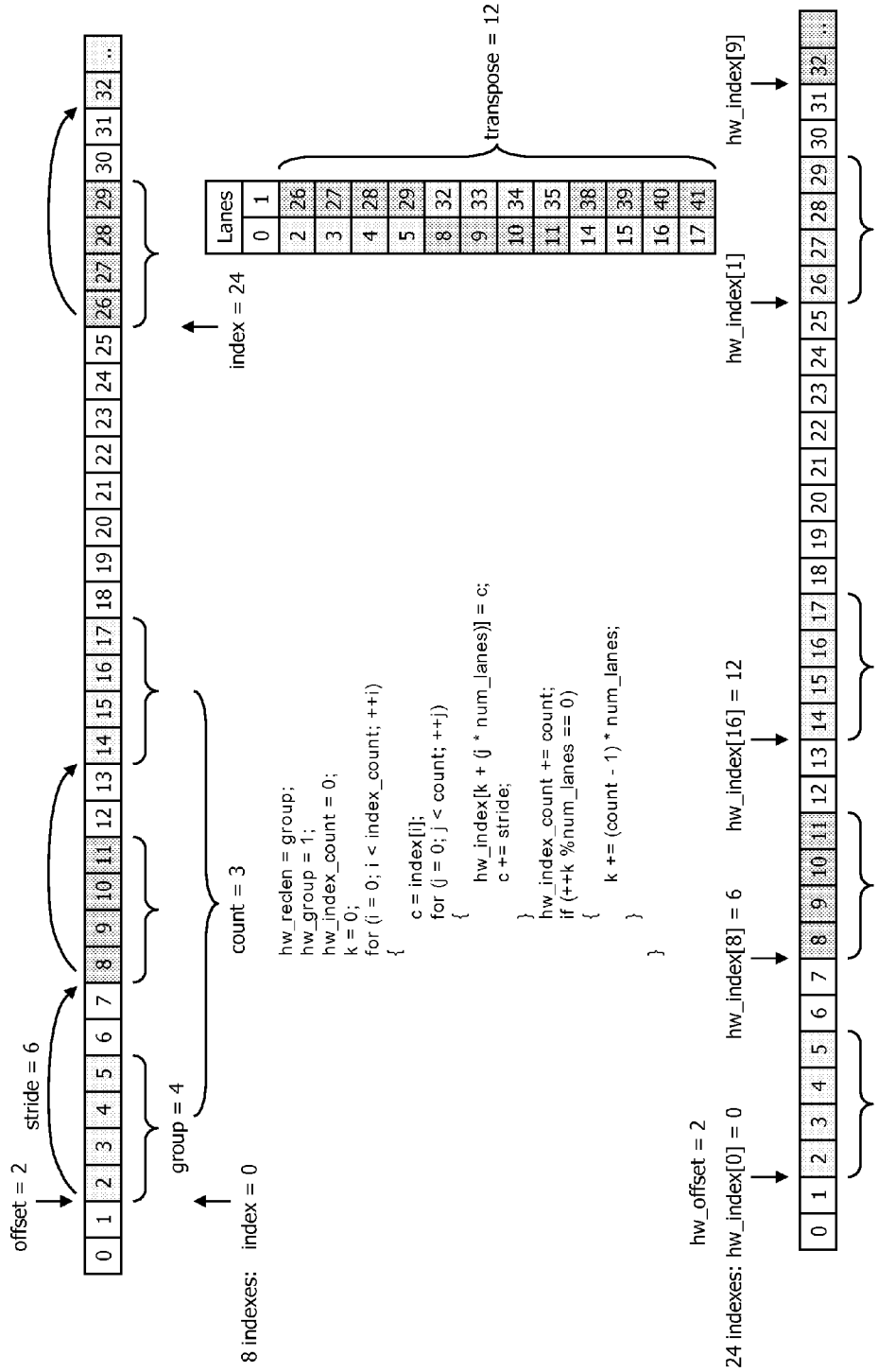
Figure 21G:
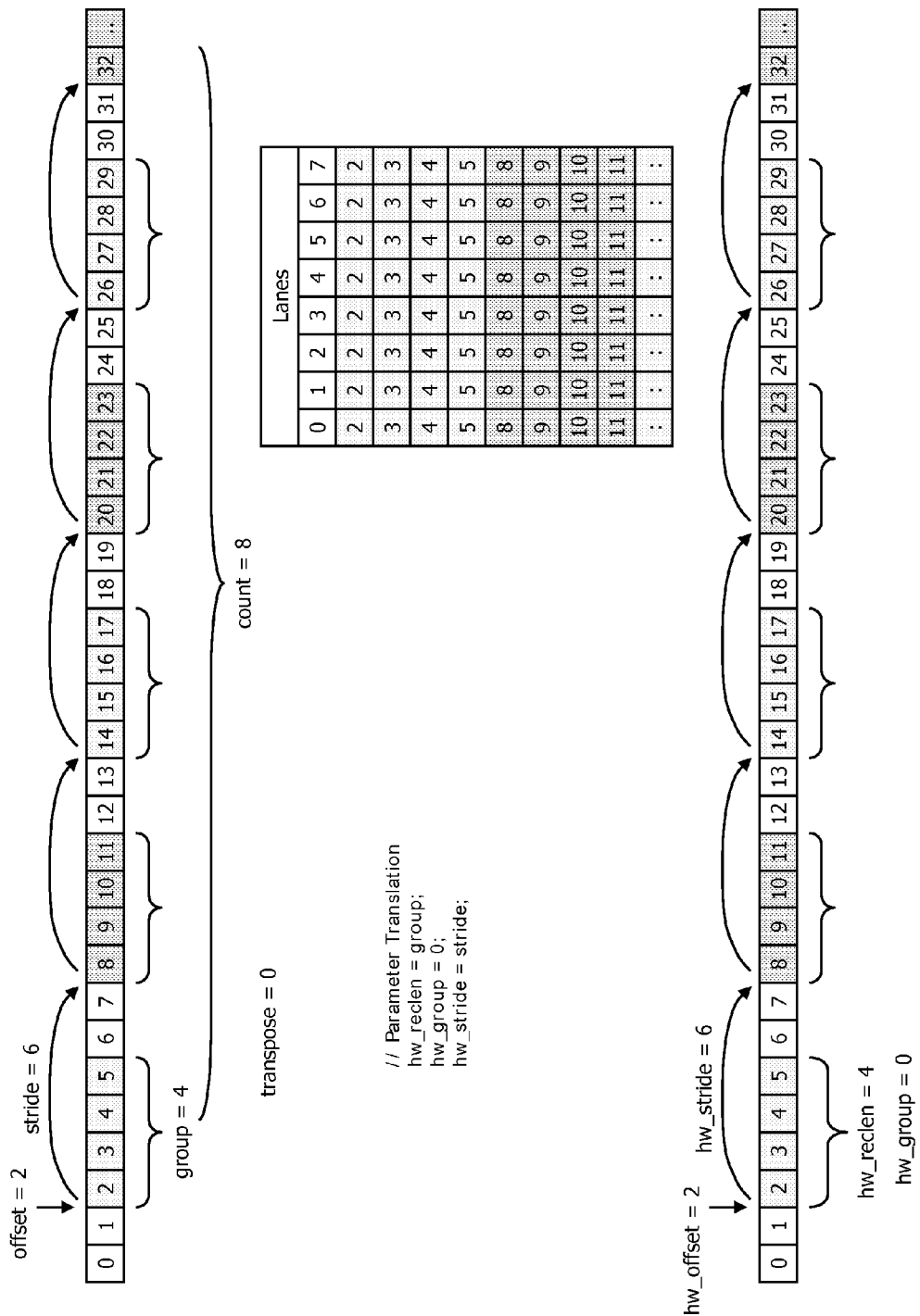
Figure 21H:
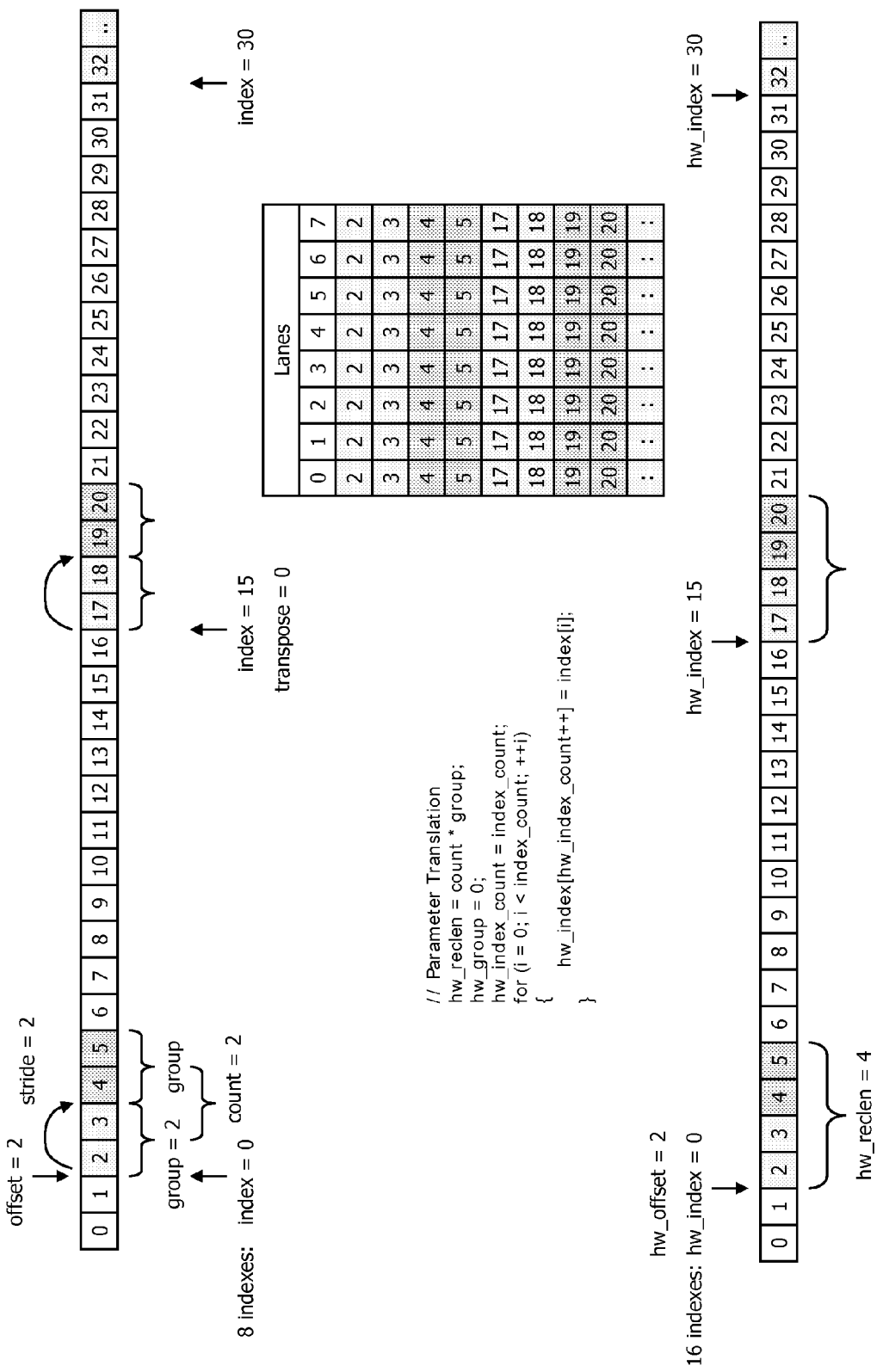
Figure 21I:
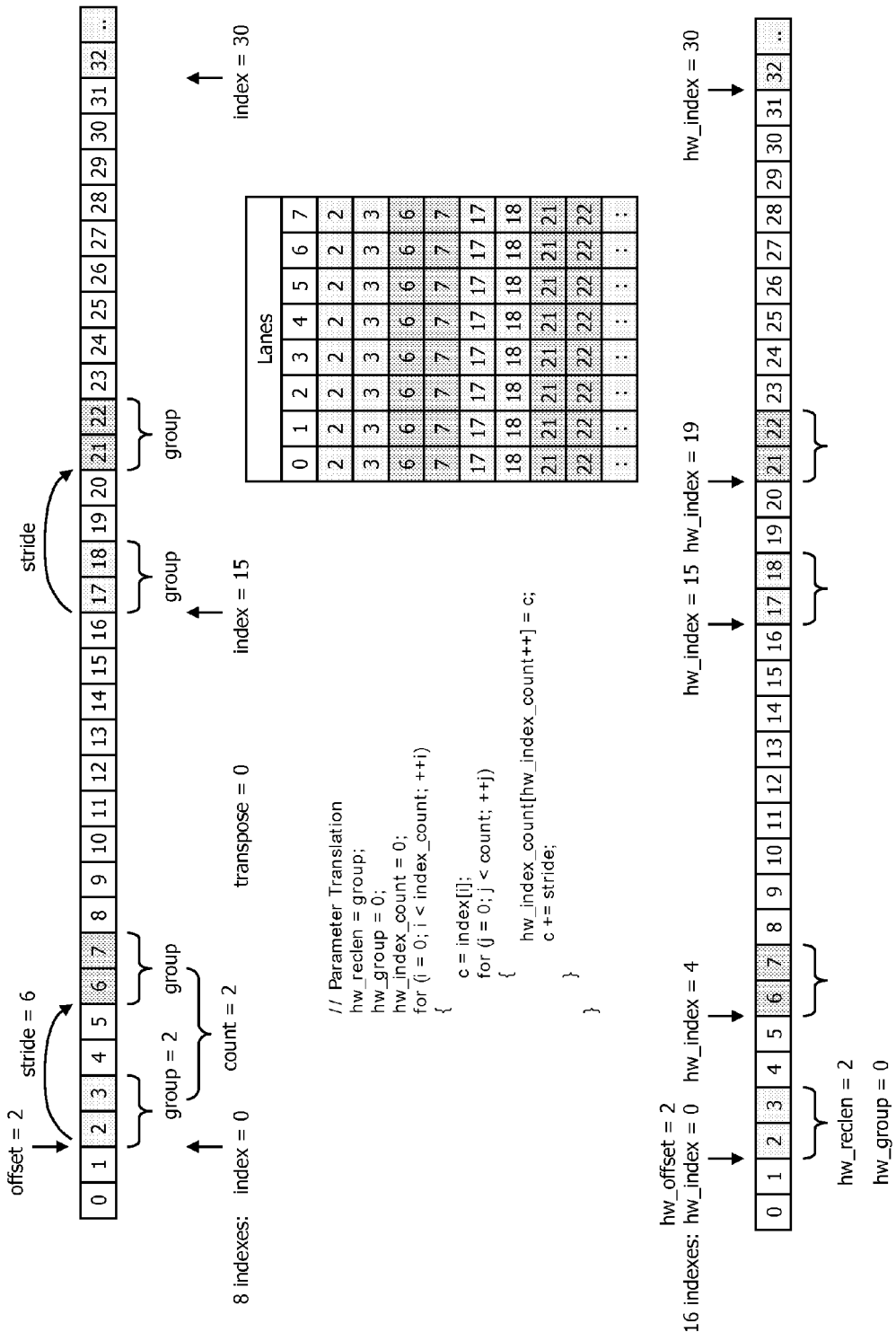
Figure 21J:
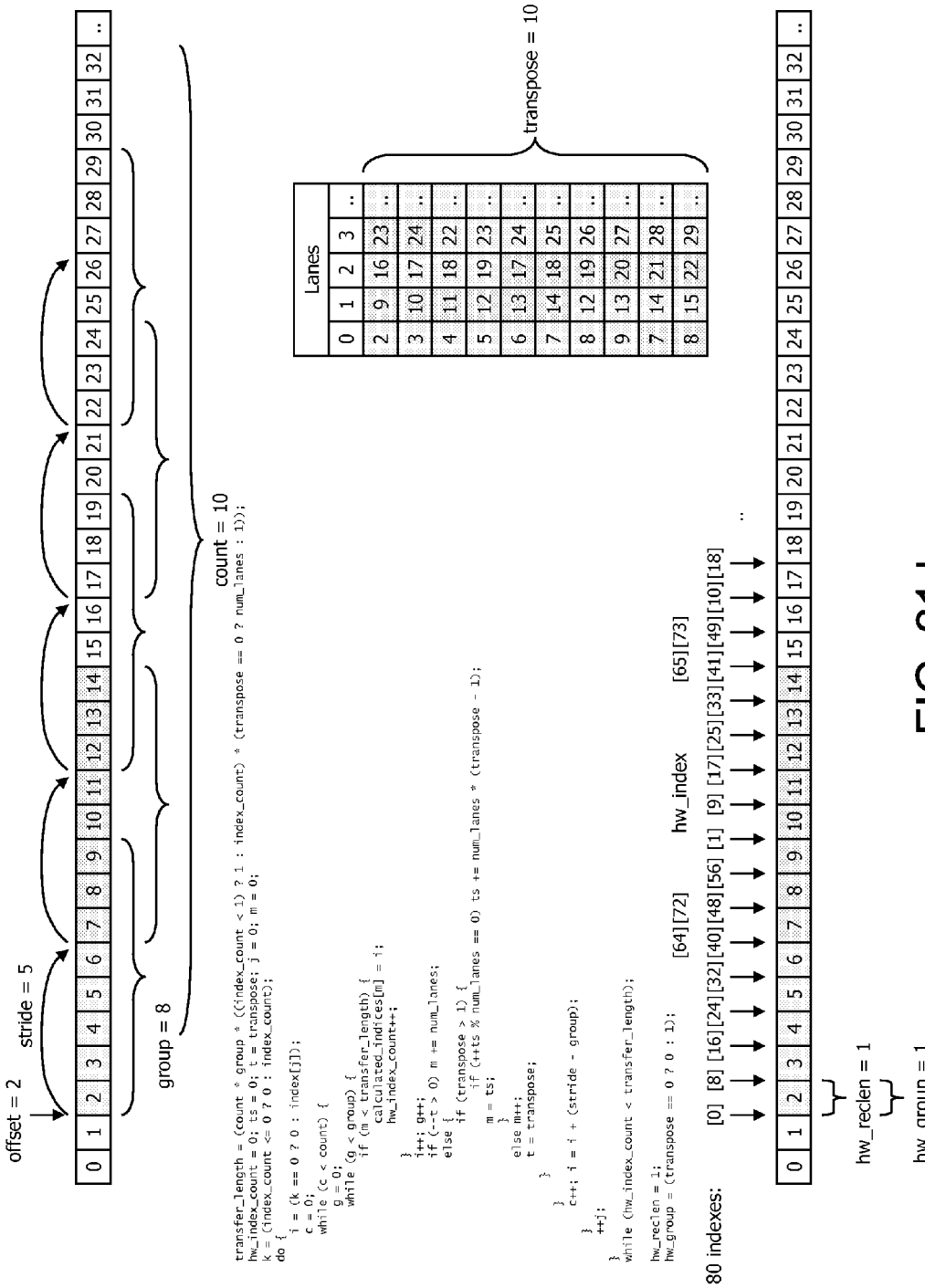

Returning to FIG. 19, if the data is indexed, the operations at lines 250-370 are performed, starting with an outer loop at line 250 that is repeated so long as the lane register files are not full. A nested while loop is begun at line 260 and repeated until all hardware indices within the hardware index register have been processed (i.e., until the loop variable 'k' is no longer less than the number hardware indices). At line 270, the input buffer address is assigned the value of the hardware offset plus the initial hardware index (hw_index[k]) before beginning another loop at line 280, which provides for a number of iterations of the operations between lines 290 and 330, according to the hw_group parameter. At line 290, another nested loop is begun to repeat the operations at lines 300 and 310 a number of times according to the hw_reclen parameter. Together, the loops at lines 280 and 290 and the operations at lines 300, 310 and 330 effect the lane register file loading operations described in reference to lines 150-200, iteratively loading hw_reclen records into each lane register file and advancing to the next lane register file to do the same, until all the records within a hardware group have been loaded. At line 350, the hardware index selector variable (i.e., loop variable 'k') is incremented to select the next hardware index, and then the operations at lines 270-350 are repeated. Overall, through repetition of the while loop at line 260 for each hardware index in the hardware index register (i.e., 'k' times), the records pointed to by each hardware index (accounting for any hardware offset though summation with hw_offset) are selected and loaded into lane register files. FIG. 20B illustrates this operation, with exemplary software parameters 2021 that include offset=2, group=4, count=2, stride=6, and indices=0, 15, 30, etc. Following the software-to-hardware parameter conversion (or translation) discussed above yields hardware parameters 2023 that include hw_offset=2, hw_reclen=2, hw_group=2, and hw_indices=0, 6, 15, 21, 30. Note that the hardware indices (hw_indices) capture the software strides, and that no hardware stride is applied in this embodiment for indexed data. Loading of lane register files in a hardware set having eight execution lanes is shown, for example, at 2025.

FIGS. 21A-21J illustrate parameter translations for each of the various pattern types shown in the table of FIG. 15.

Multi-Level Visualization with Source Code Correspondence

Using existing interactive development environments IDEs, programmers often need to add profiling code or use external tools to discover performance limitations. Writing profiling code or correlating the output of external tools with code in the IDE adds development overhead. Further, most existing IDEs are aimed at general purpose processors not high performance processors. For instance, existing IDEs may not display values striped across SIMD lanes.

The development system (i.e., tool or set of tools for developing software) introduces an interactive development environment (IDE) that contains several innovations:

1. It integrates visualization functions which help a programmer understand program performance at multiple levels alongside the conventional IDE functions such as editing and debugging.
2. It includes functions for debugging programs executing on stream processors, which allow the programmer to see how the program interacts with advanced hardware features such as SIMD processor lanes and memory managed explicitly with DMA.
   a. In particular, it provides an intuitive grid view of vector variables with processor lanes along one axis and variable names along another.

Specifically, the IDE may contain a subset or superset of the following views (figures provided to illustrate different views show highly simplified instances of the view described):

Processor schedule view: view showing schedule of processor-level operations, such as DMA transfers and computation intensive code regions, e.g. kernels, loopnests, either projected from source code or based on an actual execution trace. This view can be further enhanced by showing information about inputs and outputs (such as streams or array regions), dependences between operations, and scheduling bottlenecks such as resource saturation or contention. See FIG. 22A for one possible example of this view.

ALU schedule view: view showing schedule of ALU-level operations, such as additions, multiplies, and loads and stores, either based on static compiler schedule or an execution trace. This view can be further enhanced by showing information about inputs and outputs (such as variable names, values, and/or register locations), dependences between operations, and performance bottlenecks such as the critical path of a single block or the operations with dependences that form stronglyconnected component(s) in a loop. See FIG. 22B for one possible example of this view.

On-chip memory contents view: view showing the contents on an on-chip memory. One possible instance of this type of view shows large memory blocks such as streams or array regions for the entire on-chip address space or a region thereof, enabling a macroscopic understanding of memory layout. Another possible instance combines this view with processor-level schedule information to show how the macroscopic layout changes over time. See FIG. 22C for one possible example of this view.

Processor operation history/future: view showing list of processor-level operations (as defined above), which have been queued and/or executed by the relevant processor, either based on actual run-time state or specific point in an application trace. See FIG. 22D for one possible example of this view.

SIMD debugging view: view showing processor state or data striped across SIMD processor lanes. One possible instance of this type of view uses a grid with processor lanes along one axis and variable names along the other axis. See FIG. 22E for one possible example of this view.

Conventional IDE views showing source code, call stack, etc.

Any of these views may incorporate standard graphical functionality, including but not limited to, the ability to zoom in or out, scroll, enable or disable particular visual elements, search for and highlight specific visual elements, and select visual element (s) to display more information. Further, any of these views may display a subset or superset of the information described.

Each of these views is useful as a stand-alone application, and may introduce innovative aspects that improve the utility of such an application. However, by innovatively combining some or all of the above views in the same IDE, it is possible to navigate quickly between related views showing different aspects of program performance or functionality, thereby improving programmer efficiency. The IDE may contain some subset or superset of the following navigational mechanisms:

Navigation from processor-level operations within the processor schedule view to corresponding source code, or vice versa. For example, navigation from a DMA operation in an execution trace to lines that issue the DMA command within source code, or from a kernel or loopnest to lines that define that kernel or loopnest within source code.

Navigation from processor-level operation to corresponding ALU schedule view(s) and vice versa.

Navigation from ALU-level operation(s) within ALU schedule view to corresponding source code, or vice versa.

Navigation from on-chip memory contents view to corresponding source code, or vice versa. For example, navigation from a stream to the declaration of that stream in source code.

Navigation from on-chip memory contents view to corresponding processor-level operations within processor schedule view. For example, navigation from a stream or array region to the DMA operation used to load or store it.

Navigation from pending processor operation view to corresponding source code, or vice versa.

Navigation from SIMD debugging view to corresponding line(s) within a source code view, or vice versa. For example, from a variable to the declaration or all uses of the variable.

Navigation between views may be accomplished by one or more of a variety of interface idioms, such a mouse clicks, pressing specific key(s), or selecting a command from a menu, or a combination of such idioms such as a right-button click followed by a menu selection.

An example may serve to illustrate the utility of the different views, and the utility of the ability to easily navigate between them in a single integrated environment. For example, suppose a developer is attempting to optimize an application. The developer (e.g., a human operator) first looks at the program schedule view, and notices a kernel which dominates execution time. The developer then clicks on the kernel to bring up the kernel schedule view and sees an extremely long chain of dependent operations which is limiting performance. The developer may click on an operation in the middle of the chain to bring up the source code for that kernel, with the line containing the operation in question highlighted. The developer may toggle back and forth between the two views, clicking on different operations until the dependences are understood and a way to break the chain into parallel operations is determined. The developer makes the change, but executing the program reports that the output is now incorrect. The developer places a breakpoint at the end of the changed kernel, then inspects the on-chip memory contents view to determine which kernel output is incorrect. The developer clicks on the output in the on-chip memory view and is taken to the declaration in the source code, from which the code that computes the output value is found. The developer single-steps through that code looking at vector variables in the SIMD processor core view until finding the bug. Lastly, the developer uses the quantitative data from the processor operation history to compute the exact speedup delivered by the optimization.

Hardware/Software Recording of Co-Processor Command Execution Data

Figure 23:
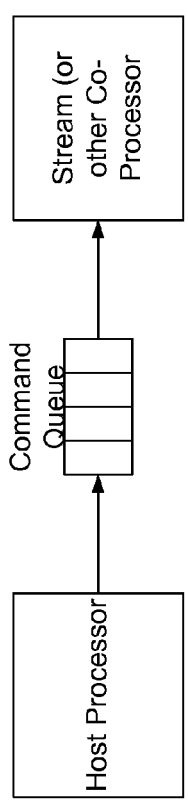
FIG. 23 illustrates a communication between a host processor and a co-processor according to an embodiment.

A stream processor, or other high-performance processor, may be implemented as co-processor specifically designed to execute computation-intensive kernels within the context of a larger application. A host CPU executes the main application code in a system. It sends commands to the co-processor using a command queue as shown in FIG. 23.

It is important to be able to collect accurate performance information about the commands executed by the co-processor. Such information allows the software to perform analysis and visualization of application performance. However, collecting this information using either software or hardware alone is unsatisfactory. Executing software on the co-processor to collect the data may be expensive enough to distort the data being collected. Adding hardware with enough memory to record a long performance trace consumes valuable chip area.

The development system includes an innovative mechanism for recording co-processor performance data that combines a short hardware trace with simple software for collecting multiple short trace segments and aggregating them into a larger trace. This hybrid mechanism provides the best of both worlds. The system host processor maintains a long record of the co-processor commands written into the command queue. Hardware monitors issue and completion of all of the commands in the queue, and records each event in a small memory. When the memory becomes full, software uses DMA to store the contents to main memory. After execution, the small memory traces are aggregated back into a single large trace by correlating their order with the long record maintained on the host.

Hardware/Software Support of Single-Stepping without a Restartable Processor

Single-stepping a program is a debugging technique in which a piece of code is executed one instruction or "step" at a time, with the programmer inspecting the state of key variables or memory locations after each step. In principle, single-stepping requires the processor be able to pause and restart a program after each instruction. Adding the ability to pause and restart a program to a high-performance processor adds even more complexity to a tightly-optimized design, which can reduce performance, increase area, or even introduce bugs.

In one embodiment the development system uses an innovative mechanism for single-stepping of a program executed on a co-processor without requiring the co-processor to support a program being paused and restarted in mid-execution. Instead, the co-processor merely needs to support stopping on a specific instruction. The control software running on the host processor then emulates running to an instruction n followed by single-stepping using one of three innovative approaches:

1. Save the co-processor state before executing each co-processor command, then run the command to instruction n. To single-step, restore the state and re-run to instruction n+1. Since the state between processor commands does not include the contents of the processor core, it is easy to save and restore. Since the co-processor is very fast this behavior appears identical to single-stepping to the user, but the hardware is much simpler.
2. Run the command to instruction n, then save all of the co-processor state including that of the processor core (using, for instance, a scan-chain). Load the co-processor state into a cycle-accurate simulator and single-step within the simulator. Since the simulator is software, it is easy to extract any desired information.
3. A hybrid approach in which the state before each processor command is saved as in approach 1, single-stepping is performed using approach 2, and execution can be resumed by restoring the saved state as in approach 1.

Efficient Co-Processor Multi-Tasking

Efficient multitasking is a challenge in any processor-based system that runs multiple applications. Embedded real-time systems are especially challenging since all tasks need to receive their input, process this data and present the corresponding output within allotted deadlines. Of particular interest are so-called "hard" real-time systems which absolutely have to complete their allocated work in time without exception or else suffer a fatal system failure, e.g. dropping video input content and/or failing to display video output on time. Conventional multitasking is typically based on "best effort", i.e. execution of each task for some duration (time or event-determined) and switching between these tasks based on priorities. Conventional multitasking does not meet the requirements of hard real-time systems because there is no guarantee that deadlines will be met. The run-time (i.e., a library of functions made available to the software developer) introduces an innovative mechanism for coupling conventional multitasking running on a host processor with a more suitable (e.g. deadline-based) multitasking mechanism that switches between tasks running on the co-processor. This innovative coupling enables hard real-time performance without requiring substantial changes to the host operating system.

Figure 24:
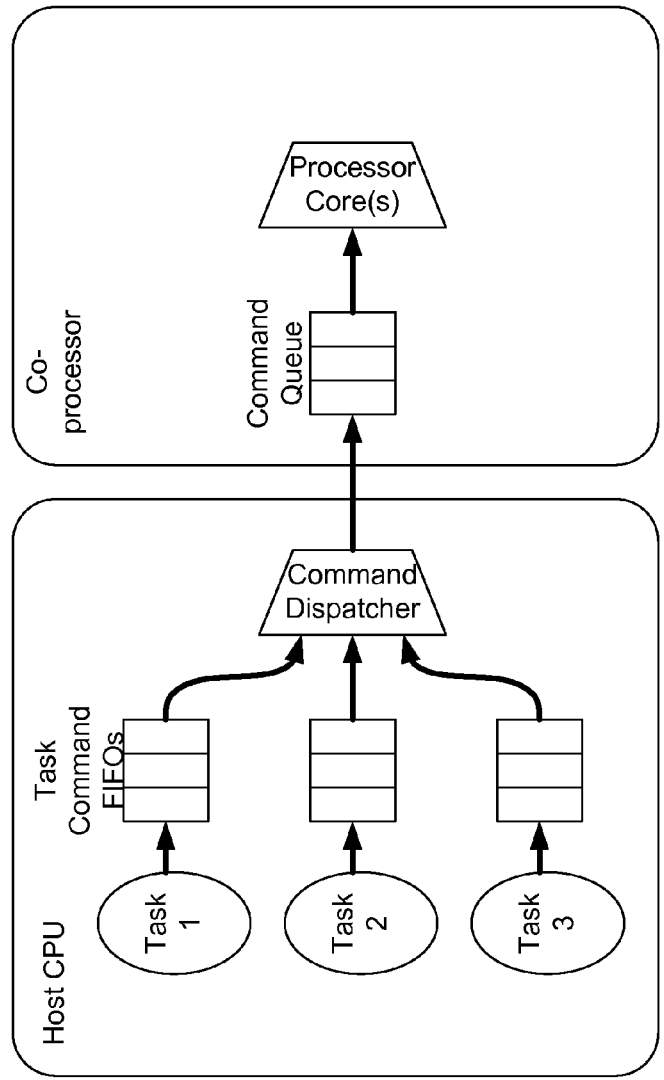
FIG. 24 illustrates a communication between a host processor and a co-processor according to another embodiment.

The run-time includes an innovative multitasking mechanism that targets hardware containing a host CPU and specialized coprocessor (such as a stream processor). The host CPU executes multiple tasks simultaneously using conventional pre-emptive multi-tasking. Each task has a dedicated co-processor command FIFO. When a task generates a co-processor command, it places it in its dedicated FIFO. The co-processor maintains a single queue of commands to be executed. When there is room in the co-processor's command queue, a special command dispatcher removes a command from one task's dedicated FIFO and places it in the co-processor's command queue. This flow is illustrated in FIG. 24.

The command dispatcher may be implemented in software and/or hardware. An implementation in software may be an interrupt handler running on the host CPU which responds to interrupts generated by the co-processor when the co-processor's command queue is either less than full or entirely empty. When it receives an interrupt, the handler sends new command(s) to the co-processor's command queue. One implementation in hardware involves actual hardware FIFOs used by tasks running on the host-CPU and hardwired dispatch logic to send commands from those FIFOs to the co-processor.

The command dispatcher may use one of several scheduling processes to decide from which task's FIFO to send a command to the co-processor next. One such process which is particularly suited to the demands of hard real-time constraints found in DSP applications is deadline scheduling. If deadline scheduling is used, it may either be implemented entirely in software, or using hardware support to monitor and track deadlines. The scheduling method may need to track and adjust to differences between task execution estimates and actual execution estimates at run-time.

When the command dispatcher switches between a FIFO containing commands from one task and a FIFO containing commands from another task, the co-processor may need to save state associated with the old task and restore state associated with the new task. Saving and restoring of state can impose a high overhead, but this overhead may be reduced by the addition of software or hardware support. One example of software support is having the programmer or compiler mark points in a task where state associated with that task is minimized and swapping would be inexpensive. One example of hardware support is using a multiple-bank on-chip memory which enables some state for the new task to be restored while the old task is still running and enables the new task to begin running while state for the old task is being stored.

Operational Context

The embodiments described above may be implemented in a programmed general-purpose or special-purpose computer system or in a network of computer systems. Alternatively, the embodiments may be implemented in a device that includes hardwired logic for carrying out the above-described operations, or any combination of programmed processors and hardwired logic.

Figure 25:
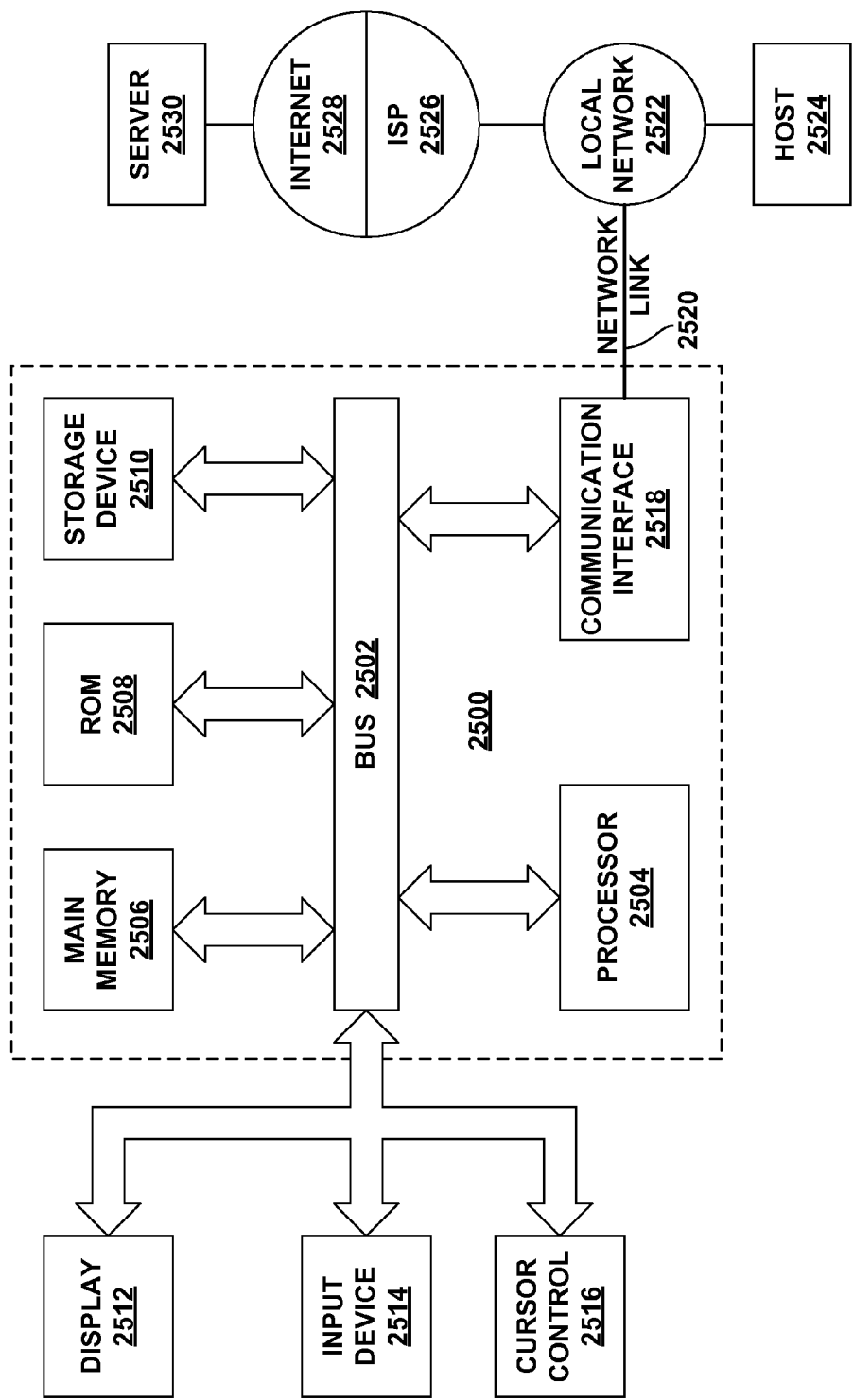
FIG. 25 illustrates a block diagram that depicts a computer system upon which an embodiment may be implemented.

FIG. 25 illustrates an exemplary a computer system 2500 upon which embodiments of the invention may be implemented. Computer system 2500 includes a bus 2502 or other communication mechanism for communicating information, and a processing entity 2504 coupled with bus 2502 for processing information. The processing entity 2504 may include any number of general purpose and/or special purposes processors co-located within a single computing system or distributed over a network of computing systems. Each integrated-circuit (IC) processor included within the processing entity may include one or more classes of on-chip storage as described above, as well as on-chip cache memory.

Computer system 2500 also includes a main memory 2506, such as a random access memory (RAM) or other dynamic storage device, coupled to bus 2502 for storing information and instructions to be executed by processing entity 2504 to carry out the above-described operations, including executing the above described compiler program code and/or program-loading code (e.g., operating system code) that responds to information encoded during compiler execution into object files, executable files and the like. Main memory 2506 also may be used for storing temporary variables or other intermediate information during execution of instructions to be executed by processing entity 2504. Computer system 2500 further includes a read only memory (ROM) 2508 or other static storage device coupled to bus 2502 for storing static information and instructions for processing entity 2504. A storage device 2510, such as a magnetic disk or optical disk, is provided and coupled to bus 2502 for storing information and instructions, such as the functions and data structures described above.

Computer system 2500 may be coupled via bus 2502 to a display 2512, such as a cathode ray tube (CRT) or flat-panel monitor, for displaying information to a computer user. An input device 2514, including alphanumeric and other keys, is coupled to bus 2502 for communicating information and command selections (e.g., the user-specified queries described above) to processing entity 2504. Another type of user input device is cursor control 2516, such as a mouse, a trackball, or cursor direction keys for communicating direction information and command selections to processing entity 2504 and for controlling cursor movement on display 2512.

Embodiments of the invention are related to the use of computer system 2500 for implementing the techniques described herein. According to one embodiment, those techniques are performed by computer system 2500 in response to processing entity 2504 executing one or more sequences of one or more instructions contained in main memory 2506. Such instructions may be read into main memory 2506 from another computer-readable medium, such as storage device 2510. Execution of the sequences of instructions contained in main memory 2506 causes processing entity 2504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processing entity 2504 for execution. Such a medium may take many forms, including but not limited to, non-volatile media, volatile media, and transmission media. Non-volatile media includes, for example, optical or magnetic disks, such as storage device 2510. Volatile media includes dynamic memory, such as main memory 2506. Transmission media includes coaxial cables, copper wire and fiber optics, including the wires that comprise bus 2502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processing entity 2504 for execution. For example, the instructions may initially be carried on a magnetic disk of a remote computer. The remote computer can load the instructions into its dynamic memory and send the instructions over a telephone line or other signaling medium using a modem. A modem local to computer system 2500 can receive the data on the signaling medium and use an infra-red transmitter to convert the data to an infra-red signal. An infra-red detector can receive the data carried in the infra-red signal and appropriate circuitry can place the data on bus 2502. Bus 2502 carries the data to main memory 2506, from which processing entity 2504 retrieves and executes the instructions. The instructions received by main memory 2506 may optionally be stored on storage device 2510 either before or after execution by processing entity 2504.

Computer system 2500 also includes a communication interface 2518 coupled to bus 2502. Communication interface 2518 provides a two-way data communication coupling to a network link 2520 that is connected to a local network 2522. For example, communication interface 2518 may be an integrated services digital network (ISDN) card or a modem to provide a data communication connection to a corresponding type of telephone line. As another example, communication interface 2518 may be a local area network (LAN) card to provide a data communication connection to a compatible LAN. Wireless links may also be implemented. In any such implementation, communication interface 2518 sends and receives electrical, electromagnetic or optical signals that carry digital data streams representing various types of information.

Network link 2520 typically provides data communication through one or more networks to other data devices. For example, network link 2520 may provide a connection through local network 2522 to a host computer 2524 or to data equipment operated by an Internet Service Provider (ISP) 2526. ISP 2526 in turn provides data communication services through the world wide packet data communication network now commonly referred to as the "Internet" 2528. Local network 2522 and Internet 2528 both use electrical, electromagnetic or optical signals that carry digital data streams. The signals through the various networks and the signals on network link 2520 and through communication interface 2518, which carry the digital data to and from computer system 2500, are exemplary forms of carrier waves transporting the information.

Computer system 2500 can send messages and receive data, including program code, through the network(s), network link 2520 and communication interface 2518. In the Internet example, a server 2530 might transmit a requested code for an application program through Internet 2528, ISP 2526, local network 2522 and communication interface 2518.

The received code may be executed by processing entity 2504 as it is received, and/or stored in storage device 2510, or other non-volatile storage for later execution. In this manner, computer system 2500 may obtain application code in the form of a carrier wave.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. A computer-implemented method of communication scheduling within a processor including multiple register files, the method comprising:

representing the multiple register files as vertices in a graph over multiple clock cycles such that the graph includes a vertex corresponding to each individual register file during each of the multiple clock cycles;

representing connections between the vertices in the graph as a plurality of edges that collectively describe possible sub-routes of data propagation among the multiple register files over the multiple clock cycles;

assigning to each individual edge a weight representing a relative availability of a corresponding sub-route; and determining, via a machine-executable compiler executing on a computer, a schedule of communications within the processor, wherein the schedule of communications is represented as a route through the graph, and the route is based, at least in part, on weights assigned to the plurality of edges in the graph.

2. The method of claim 1, wherein the weights are assigned based, at least in part, on an amount of resource usage.

3. The method of claim 1, wherein the weights are assigned based, at least in part, on a fullness of the multiple register files.

4. The method of claim 1, wherein at least one of the plurality of edges form a connection between a first vertex corresponding to a first state of a data value in a first clock cycle and a second vertex corresponding to a second state of the data value in the first clock cycle.

5. The method of claim 1, wherein at least one of the plurality of edges form a connection between a first vertex corresponding to a first state of a data value in a first clock cycle and a second vertex corresponding to a second state of the data value in a second clock cycle.

6. The method of claim 5, wherein the first state of the data value corresponds to a first register file and wherein the second state of the data value also corresponds to the first register file.

7. The method of claim 6, wherein the at least one of the plurality of edges correspond to a continuous storing of the data value within the first register file.

8. The method of claim 5, wherein the first state of the data value corresponds to a first register file and wherein the second state of the data value corresponds to a second register file.

9. The method of claim 8, wherein the at least one of the plurality of edges comprise a pass operation for the data value.

10. The method of claim 5, wherein the first state of the data value corresponds to a first register file and wherein the second state of the data value corresponds to an on-chip memory.

11. The method of claim 10, wherein the at least one of the plurality of edges comprise a spill operation for the data value.

12. The method of claim 1, wherein the step of determining the schedule of communications represented as the route through the graph comprises determining the route through the graph based, at least in part, on a shortest-path algorithm.

13. The method of claim 1, wherein the step of determining the schedule of communications within the processor is determined in sub-quadratic time.

14. The method of claim 1, wherein the step of determining the schedule of communications within the processor comprises considering all possible permutations of routes for open communications.

15. The method of claim 1, wherein the step of determining the schedule of communications within the processor comprises arbitrarily selecting a specific route for each open communication.

16. The method of claim 1, wherein the step of assigning to each individual edge the weight representing the relative availability of the corresponding sub-route comprises one or more of:
  assigning a lower relative weight to edges to give preference to routes through the graph that avoid resource conflicts;
  assigning a lower relative weight to edges that reuse resources for multiple communications of the same output;
  assigning a lower relative weight to edges that minimize pass or spill operations; and
  assigning a lower relative weight to edges that do not occupy registers in near-full register files.

17. The method of claim 1, further comprising:
  updating the weights assigned to the plurality of edges during the communication scheduling to reflect a current schedule state.

18. The method of claim 1, wherein the processor includes at least one arithmetic logic unit and at least one crossbar configured to couple the at least one arithmetic logic unit to at least one of the multiple register files and the at least one arithmetic logic unit is configured to support a pass operation in which the at least one arithmetic logic unit drives a value from one of the multiple register files onto the at least one crossbar.

19. The method of claim 1, wherein the step of determining the schedule of communications within the processor includes adding a pass operation modeled as a series of edges and vertices that connects the vertex for a register file on cycle M with a vertex for a crossbar on cycle N, where N=M+pass latency−1, and the vertex for the crossbar on cycle N is connected to a set of register file vertices on cycle N+1.

20. The method of claim 1, wherein the graph includes for each register file a starts-in vertex and a stays-in vertex and each possible pass operation is represented by a series of vertices connecting at least one starts-in vertex to a crossbar vertex on cycle L, where L=pass latency−1.

21. A system configured to perform communication scheduling within a processor including multiple register files, the system comprising:
  means for representing the multiple register files as vertices in a graph over multiple clock cycles such that the graph includes a vertex corresponding to each individual register file during each of the multiple clock cycles;
  means for representing connections between the vertices in the graph as a plurality of edges that collectively describe possible sub-routes of data propagation among the multiple register files over the multiple clock cycles;
  means for assigning to each individual edge a weight representing a relative availability of a corresponding sub-route; and
  means for determining a schedule of communications within the processor, wherein the schedule of communications is represented as a route through the graph, and the route is based, at least in part, on the weights assigned to the plurality of edges in the graph.

22. The system of claim 21, wherein the means for determining the schedule of communications represented as the route through the graph comprises means for determining the route through the graph based, at least in part, on a shortest-path algorithm.

23. The system of claim 21, wherein the means for determining the schedule of communications within the processor comprises means for determining the route through the graph based, at least in part, on a shortest-path algorithm.

24. A non-transitory computer-readable medium having instructions stored thereon to perform communication scheduling within a processor including multiple register files, the instructions comprising:
  instructions for representing the multiple register files as vertices in a graph over multiple clock cycles such that the graph includes a vertex corresponding to each individual register file during each of the multiple clock cycles;
  instructions for representing connections between the vertices in the graph as a plurality of edges that collectively describe possible sub-routes of data propagation among the multiple register files over the multiple clock cycles;

instructions for assigning to each individual edge a weight representing a relative availability of a corresponding sub-route; and instructions for determining a schedule of communications within the processor, wherein the schedule of communications is represented as a route through the graph, and the route is based, at least in part, on weights assigned to the plurality of edges in the graph.

25. The non-transitory computer-readable medium of claim 24, wherein the instructions for determining the schedule of communications within the processor comprise instructions for determining the route through the graph based, at least in part, on a shortest-path algorithm.

26. A system comprising:
a first processor configured to perform scheduling of communication within a second processor including multiple register files, wherein the first processor configured is to perform communication scheduling by:
representing the multiple register files as vertices in a graph over multiple clock cycles such that the graph includes a vertex corresponding to each individual register file during each of the multiple clock cycles;
representing connections between the vertices in the graph as a plurality of edges that collectively describe possible sub-routes of data propagation among the multiple register files over the multiple clock cycles;
assigning to each individual edge a weight representing a relative availability of a corresponding sub-route; and
determining a schedule of communications within the second processor, wherein the schedule of communications is represented as a route through the graph, and the route is based, at least in part, on weights assigned to the plurality of edges in the graph.

27. The system of claim 26, wherein the first processor is further configured to perform the determining of the schedule of communications within the second processor by determining the route through the graph based, at least in part, on a shortest-path algorithm.

28. A computer-implemented method for scheduling data transfers in a processor including multiple register files and one or more arithmetic logic units, the method comprising:
determining, via a machine-executable compiler executing on a computer, a sequence of data transfers over multiple clock cycles to transfer an output of one of the arithmetic logic units to an input of one of the arithmetic logic units by using a shortest-path algorithm that solves a problem modeled as a route through a graph that includes (1) a vertex corresponding to each individual register file during each of the multiple clock cycles and (2) a plurality of edges that form connections between the vertices and describe possible data transfers among the multiple register files over the multiple clock cycles, wherein the shortest-path algorithm determines the route through the graph based, at least in part, on weights assigned to the plurality of edges in the graph, and each individual edge is assigned a weight representing a relative availability of a corresponding sub-route.

* * * * *

UNITED STATES PATENT AND TRADEMARK OFFICE
CERTIFICATE OF CORRECTION

PATENT NO. : 8,332,829 B2
APPLICATION NO. : 12/192862
DATED : December 11, 2012
INVENTOR(S) : Mattson It is certified that error appears in the above-identified patent and that said Letters Patent is hereby corrected as shown below:

On the Title Page, in Item (56), under "OTHER PUBLICATIONS", in Column 2, Line 1, delete "al.;" and insert -- al., --, therefor.

On the Title Page, in Item (56), under "OTHER PUBLICATIONS", in Column 2, Line 4, delete "al.;" and insert -- al., --, therefor.

On the Title Page, in Item (56), under "OTHER PUBLICATIONS", in Column 2, Line 5, delete "al.:" and insert -- al., --, therefor.

On the Title Page, in Item (56), under "OTHER PUBLICATIONS", in Column 2, Line 7, delete "al.;" and insert -- al., --, therefor.

In the Drawings:

In Fig. 22A, Sheet 32 of 35, delete "Strream2" and insert -- Stream2 --, therefor.

In Fig. 22A, Sheet 32 of 35, delete "Figure" and insert -- Fig. --, therefor at each occurrence throughout the drawings.

In Fig. 23, Sheet 34 of 35, delete "Processor" and insert -- Processor) --, therefor.

In the Specifications:

In Column 6, Line 15, delete "an non-categorized" and insert -- a non-categorized --, therefor.

In Column 12, Line 21, delete "L," and insert -- L --, therefor.

Signed and Sealed this
Ninth Day of July, 2013

Teresa Stanek Rea
*Acting Director of the United States Patent and Trademark Office*

CERTIFICATE OF CORRECTION (continued)
U.S. Pat. No. 8,332,829 B2

In Column 15, Line 54, delete "(advancing" and insert -- advancing --, therefor.

In Column 18, Line 56, delete "For" and insert -- FOR --, therefor.

In Column 18, Line 58, delete "For" and insert -- FOR --, therefor.

In Column 22, Line 43, delete "dependences" and insert -- dependencies --, therefor.

In Column 22, Line 53, delete "dependences" and insert -- dependencies --, therefor.

In Column 22, Line 55, delete "dependences" and insert -- dependencies --, therefor.

In Column 24, Line 9, delete "dependences" and insert -- dependencies --, therefor.